United States Patent
Hardage

(10) Patent No.: US 8,040,754 B1
(45) Date of Patent: Oct. 18, 2011

(54) SYSTEM AND METHOD FOR ACQUISITION AND PROCESSING OF ELASTIC WAVEFIELD SEISMIC DATA

(75) Inventor: Bob A. Hardage, Burnet, TX (US)

(73) Assignee: Board of Regents of the University of Texas System, Austin, TX (US)

(*) Notice: Subject to any disclaimer, the term of this patent is extended or adjusted under 35 U.S.C. 154(b) by 0 days.

(21) Appl. No.: 12/870,601

(22) Filed: Aug. 27, 2010

(51) Int. Cl.
 *G01V 1/28* (2006.01)
 *G01V 1/02* (2006.01)
(52) U.S. Cl. .............. 367/38; 367/47; 367/58; 367/37
(58) Field of Classification Search ............ 73/152.01, 73/152.16, 597, 784; 181/114, 118–121; 367/14, 21, 27, 31, 36, 56, 58, 72, 74, 75, 367/86, 141, 142, 144, 189, 421; 702/6, 702/11, 14, 16, 18
See application file for complete search history.

(56) References Cited

U.S. PATENT DOCUMENTS

| | | | |
|---|---|---|---|
| 4,397,005 A * | 8/1983 | Gassaway et al. ............ 367/36 |
| 4,472,794 A * | 9/1984 | Chelminski ................ 367/144 |
| 4,596,005 A | 6/1986 | Fraiser | |
| 4,817,062 A | 3/1989 | De Buyl et al. | |
| 5,154,254 A * | 10/1992 | Thompson et al. .......... 181/121 |
| 5,742,560 A | 4/1998 | Krebs | |
| 6,061,298 A * | 5/2000 | Madtson et al. ............. 367/21 |
| 6,094,401 A | 7/2000 | Masak et al. | |
| 6,292,754 B1 | 9/2001 | Thomsen | |
| 6,351,991 B1 * | 3/2002 | Sinha ...................... 73/152.01 |
| 6,488,117 B1 | 12/2002 | Owen | |
| 6,498,990 B2 * | 12/2002 | Hardage et al. ............. 702/14 |
| 6,564,150 B2 | 5/2003 | Gilmer et al. | |
| 6,714,867 B2 | 3/2004 | Meunier | |
| 7,104,956 B1 | 9/2006 | Christopher | |
| 7,178,626 B2 | 2/2007 | Matherne et al. | |
| 7,577,061 B2 | 8/2009 | Williamson et al. | |
| 7,628,248 B2 | 12/2009 | Wei et al. | |
| 7,639,567 B2 | 12/2009 | Sitton et al. | |
| 2002/0163857 A1 * | 11/2002 | Bahorich et al. ............. 367/14 |
| 2010/0085835 A1 | 4/2010 | Tang et al. | |

OTHER PUBLICATIONS

Sena, Arcangelo Gabriele, "Elastic Wave Propagation in Anisotropic Media: Source Theory, Traveltime Computations and Migration," Ph.D. Thesis, Department of Earth, Atmospheric, and Planetary Sciences, Massachusetts Institute of Techology, May 1992.*

Abstract Only—Borchardt, T. M., Key elements of regional seismic velocity models for long period ground motion simulations, Journal of Seismology, Apr. 2008, v. 12, No. 2, Springer Netherlands, pp. 217-221.

Abstract Only—Doherty, F., How 3DVSP has become a practical proposition, First Break, May 2004, issue 5, v. 22.

(Continued)

*Primary Examiner* — Jack Keith
*Assistant Examiner* — Daniel L Murphy
(74) *Attorney, Agent, or Firm* — Foley & Lardner LLP

(57) ABSTRACT

A system and method of acquiring and processing full elastic waveform data from a vertical-force source comprises providing seismic waves into the earth from the vertical-force source, sensing reflections of the seismic waves at multi-component geophones placed along the surface of the earth, and processing the reflections of the seismic waves to generate full elastic waveform data.

16 Claims, 18 Drawing Sheets

OTHER PUBLICATIONS

Abstract Only—Ma, X-Q., Global joint inversion for the estimation of acoustic and shear impedances from AVO derived P- and S-wave reflectivity data, First Break, Oct. 2001, issue 10, v. 19.

Abstract Only—Wathelet, M., et al. Array performances for ambient vibrations on a shallow structure and consequences over V's inversion, Journal of Seismology, Jan. 2008, v. 12, No. 1, Springer Netherlands, pp. 1-19.

Abstract Only—Wei, Z., et al., Harmonic distortion reduction on seismic vibrators, The Leading Edge, Mar. 2010, v. 29, No. 3, pp. 256-261.

Abstract Only—Winterstein, D. F., et al., Twelve years of vertical birefringence in nine-component VSP data, Geophysics, 2001, v. 66, issue 2, p. 582.

DiSiena, J. P., et al., Three-component vertical seismic profiles—orientation of horizontal components for shear wave analysis, Tech. Paper S5.4, 1981, $51^{st}$ Annual Meeting of Society of Exploration Geophysicists, pp. 1991-2011.

Hardage, B. A. et al., Defining P-wave and S-wave stratal surfaces with nine-component VSPs, The Leading Edge, Aug. 2003, pp. 720-729.

Hardage, B., Horizontal Wave Testing Helps, AAPG Explorer, 2009, v. 30, No. 12, pp. 26-27.

Hardage, B., Horizontal Wave Testing: Part 2, AAPG Explorer, 2010, v. 31, No. 1, pp. 32-33.

Hardage, B., Professional Summary dated Oct. 12, 2010, pp. 1-26.

Hardage, B. A., Vertical Seismic Profiling, Part A, Principles, Geophysical Press, 1983, v. 14A, pp. 307-315 [and cover page].

Levin, F. K., Seismic velocities in transversely isotropic media, Geophysics, 1979, v. 44, pp. 918-936.

Levin, F. K., Seismic velocities in transversely isotropic media, II, Geophysics, 1980, v. 45, pp. 3-17.

Li, Y., et al., Imaging through gas-filled sediments with land 3-C seismic data (Powerpoint), EAGE 69th Conference and Exhibition, London, UK, Jun. 13, 2007, 42 pages.

Li, Y., et al., Imaging through Gas-Filled Sediments with Land 3C Seismic Data, EAGE 69th Conference & Exhibition, London, UK, Jun. 11-14, 2007, 5 pages.

Miller, G. F., et al., The field and radiation impedance of mechanical radiators on the free surface of a semi-infinite isotropic solid, Proc. Royal Society London, 1954, Series A, v. 223, pp. 521-541 [and cover page].

Robertson, J. D., et al., Radiation patterns of a shear-wave vibrator in near-surface shale, Geophysics, Jan. 1983, v. 48, No. 1, pp. 19-26.

White, J. E., Underground Sound—Applications of Seismic Waves, Methods in Geochemistry and Geophysics, 18, 1983, Elsevier Science Publishers, pp. 208-209 [and cover page].

Yang, L., et al. Pure S-waves in land P-wave source VSP data, Applied Geophysics, Sep. 2007, vol. 4, No. 3, pp. 173-182.

Robert E. Sheriff, Encyclopedic Dictionary of Exploration Geophysics, Third Edition, Society of Exploration Geophysicists, Published 1991, 3 pages.

\* cited by examiner

SYSTEM AND METHOD FOR ACQUISITION AND PROCESSING OF ELASTIC WAVEFIELD SEISMIC DATA

BACKGROUND

The present application relates generally to systems and methods for seismic exploration, including the acquisition and processing of seismic data to estimate properties of the Earth's subsurface.

The principal type of data used to explore for oil and gas resources is seismic reflection data that image subsurface geology. There are three seismic wave modes that can be used for subsurface imaging—a compressional-wave (P) mode and two shear-wave modes (SV and SH). When geophysicists acquire seismic data that have all three of these modes, the data are called full elastic-wavefield data. Full elastic-wavefield data have been acquired by deploying three separate orthogonal seismic sources at every source station across a prospect area. One source applies a vertical force vector to the Earth, a second source applies a horizontal force vector in the inline (X) direction, and a third source applies a second horizontal force vector in the crossline (Y) direction.

SUMMARY

A system and method of acquiring and processing full elastic waveform data from a vertical-force source comprises providing seismic waves into the earth from the vertical-force source, sensing reflections of the seismic waves at multi-component geophones placed along the surface of the earth, and processing the reflections of the seismic waves to generate full elastic waveform data.

According to another exemplary embodiment, a system and method of processing horizontal shear wave mode data from a vertical-force source comprises providing seismic waves from the vertical-force source, sensing reflections of the seismic waves at multi-component geophones placed along the surface of the earth, and processing the reflections of the seismic waves to generate horizontal shear wave mode data.

According to another exemplary embodiment, a system for acquiring and processing shear wave mode data from an explosive source comprises a vertical-force source configured to provide seismic waves, a multi-component geophone, and a processing circuit. The multi-component geophone is placed along the surface of the Earth. The geophone is configured to sense reflections of the seismic waves. The processing circuit is configured to process the reflections of the seismic waves to generate horizontal shear wave mode data. The processing comprises providing polarity correction to the reflections to achieve the horizontal shear wave mode data.

According to another exemplary embodiment, a system for acquiring and processing shear wave mode data from a vertical-force source other than an explosive source comprises a vertical-force source, a multi-component geophone and a processing circuit. The vertical-force source is configured to provide seismic waves comprising compressional P mode and both fundamental shear modes (SH and SV) in the earth directly at a point of application of the vertical-force source. The vertical-force source is a non-explosive source. The multi-component geophone is placed along the surface of the Earth. The geophone is configured to sense reflections of the seismic waves. The processing circuit is configured to process the reflections of the seismic waves to generate shear wave mode data.

DETAILED DESCRIPTION OF EXEMPLARY EMBODIMENTS

Figure 1:
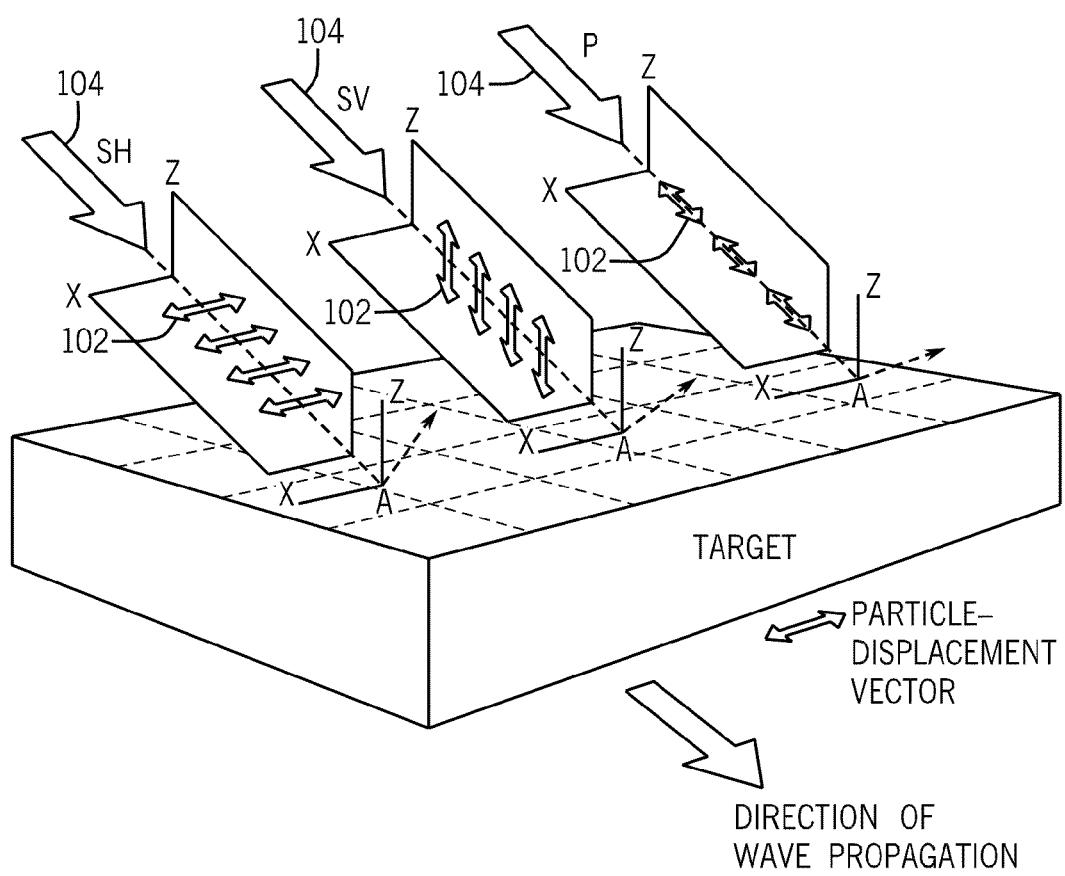
FIG. 1 is a diagram illustrating a full-elastic, multicomponent seismic wavefield propagating in a homogeneous Earth, according to an exemplary embodiment.

One or more embodiments described herein may provide a method by which full elastic-wavefield seismic data (P, SV and SH modes) can be acquired and processed using only one source, a vertical-force source. The embodiments may be simpler and lower-cost than using three orthogonal-force sources. The embodiments may be used in oil and gas exploration and exploitation where seismic data are widely used. The embodiments may remove numerous technical, environmental, and cost barriers that limit applications of full elastic-wavefield seismic data.

One or more embodiments described herein may involve departures from conventional seismic data processing strategy.

One or more embodiments described herein may reduce the cost of acquiring complete elastic-wavefield seismic data. The daily rate for utilizing a single vertical-force source is less than the rates of deploying both a vertical-force source and a horizontal-force source to acquire equivalent data. Further, data may be acquired quicker by deploying a single source at each source station to create full elastic-wavefield data rather than deploying a vertical-force source and a horizontal-force source. The longer a contractor works to acquire data, the greater the cost of the data.

One or more embodiments described herein may provide the ability to acquire elastic-wavefield seismic data across a wider range of surface conditions, such as swamps, marshes, rugged mountain terrain, dense timber, and agricultural regions. Vertical-force sources can operate in a wide variety of surface terrains. For example, shot hole explosives can be used in swamps, marshes, heavy timber, or rugged mountains, all of which are places horizontal sources cannot be deployed at all, or at great cost because of site preparations. Vertical vibrators can be deployed in high-culture and residential areas without causing physical damage to buildings and infra-structure.

One or more embodiments described herein may provide a wider choice of seismic sources. There is a limited choice of horizontal-force seismic sources—such as heavy, horizontal vibrators or inclined-impact sources. The total number of horizontal vibrators across the world is small. The number of inclined-impact sources is less. More of each type of source could be manufactured if demand appears. In contrast, there are hundreds of vertical-force sources. The dominating classes of vertical-force sources are vertical vibrators (hundreds around the world) and shot hole explosives (available anywhere). Vertical-impact sources are few, but they too can be manufactured in mass if a market is created. For vertical seismic profile (VSP) data acquisition in remote areas (for example equatorial jungles), an air gun fired in a mud pit would be a vertical-force source. One or more embodiments described herein may allow geoscientists to select from a large menu of vertical-force sources: vertical vibrators, shothole explosives, vertical-impactors, or mud pit air guns.

Wave Components

Referring to FIG. 1, a full-elastic, multicomponent seismic wavefield propagating in a simple homogenous Earth is illustrated. Three independent, vector-based, seismic wave modes propagate in the Earth: a compressional mode, P, and two shear modes, SV and SH (FIG. 1). Each mode travels through the Earth at a different velocity, and each mode distorts the Earth in a different direction as it propagates. Double-headed arrows 102 are particle-displacement vectors indicating the direction in which each mode displaces the Earth. Arrows 104 illustrate a direction of wave propagation. Acquisition of the multicomponent modes results in full elastic-wavefield data. The orientations of the P, SV, and SH displacement vectors relative to the propagation direction of each mode are illustrated in FIG. 1.

The propagation velocities of the SH and SV shear modes may differ by only a few percent, but both shear velocities ($V_S$) are significantly less than the P-wave velocity ($V_P$). The velocity ratio $V_P/V_S$ can vary by an order of magnitude in Earth media, from a value of 50 or more in deep-water, unconsolidated, near-seafloor sediment to a value of 1.5 in a few dense, well-consolidated rocks.

Figure 2:
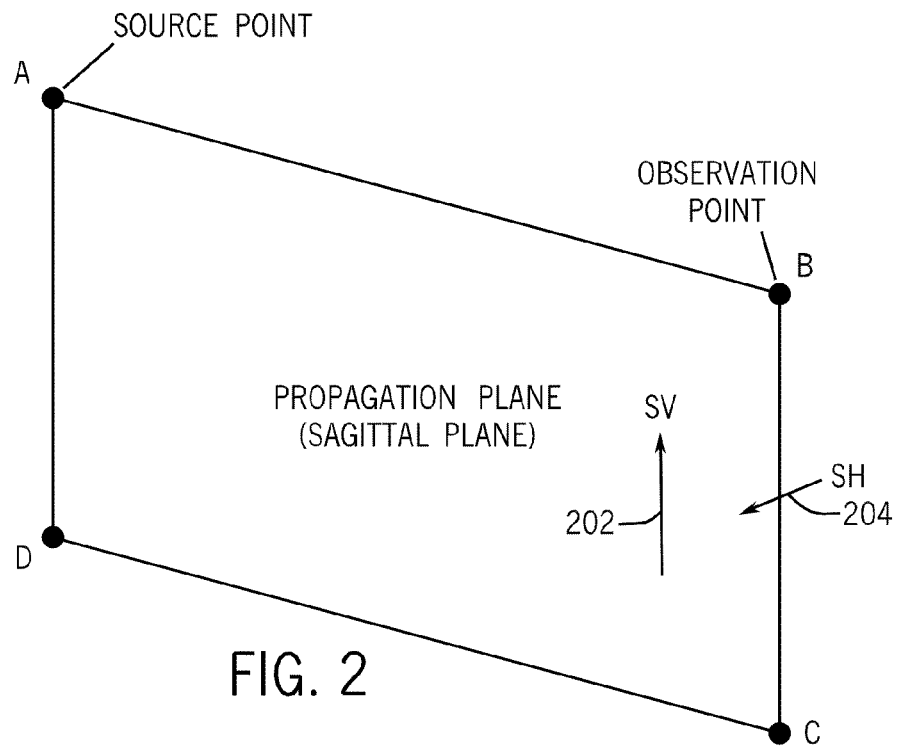
FIG. 2 is a diagram showing SH and SV shear wave displacements, according to an exemplary embodiment.

Referring to FIG. 2, an exemplary distinction between SH and SV shear modes is illustrated. SH and SV shear modes may be distinguished by imagining a vertical plane passing through a source station A and a receiver station B. SV vector displacement occurs in this vertical plane, as indicated at arrow 202; SH vector displacement is normal to the plane, as indicated at arrow 204. This vertical plane passing through the coordinates of a source station A, a receiver station B, and a reflection point C or D produced by that source-receiver pair may be called a sagittal plane or propagation plane.

Horizontal-Force Sources and SH/SV Illumination

Figure 3:
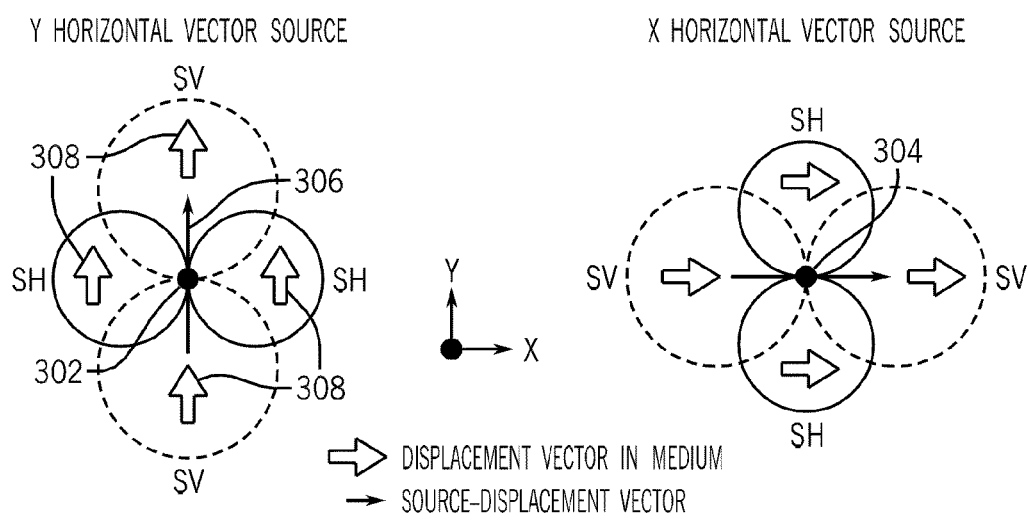
FIG. 3 is a map view of SH and SV illumination patterns for orthogonal (X and Y) horizontal-displacement sources.

Referring to FIG. 3, a map view of theoretical SH and SV radiation patterns produced by orthogonal horizontal-displacement sources 302, 304 will be described. Mathematical expressions that describe the geometrical shape of P, SV, and SH radiation patterns produced by seismic sources in an isotropic Earth are described by White (1983). Viewed from directly above the horizontal-displacement source, SV and SH modes propagate away from the source stations 302, 304 as expanding circles or ellipses. To simplify the graphic description, the patterns will be shown as circles. Because SV radiation from a horizontal-displacement source 302, 304 is more energetic than SH radiation, SV radiation circles are drawn larger than SH radiation circles. These circles indicate which parts of the image space each mode affects and the magnitude of the mode illumination that reaches each image coordinate. The relative sizes of these circles are qualitative and are not intended to be accurate in a quantitative sense.

A horizontal source-displacement vector oriented in the Y direction (left side of figure) causes SV modes to radiate in the +Y and −Y directions and SH modes to propagate in the +X and −X directions. A horizontal source-displacement vector oriented in the X direction (right side of figure) causes SV modes to radiate in the +X and −X directions and SH modes to propagate in the +Y and −Y directions. If a line is drawn from the source station 302, 304 to intersect one of these radiation circles, the distance to the intersection point indicates the magnitude of that particular mode displacement in the azimuth direction of that line. The orientation of the particle-displacement vector remains constant across the image space, but the magnitude of the SH and SV particle-displacement vectors vary with azimuth as shown by the SH and SV radiation circles on FIG. 3.

Figure 4:
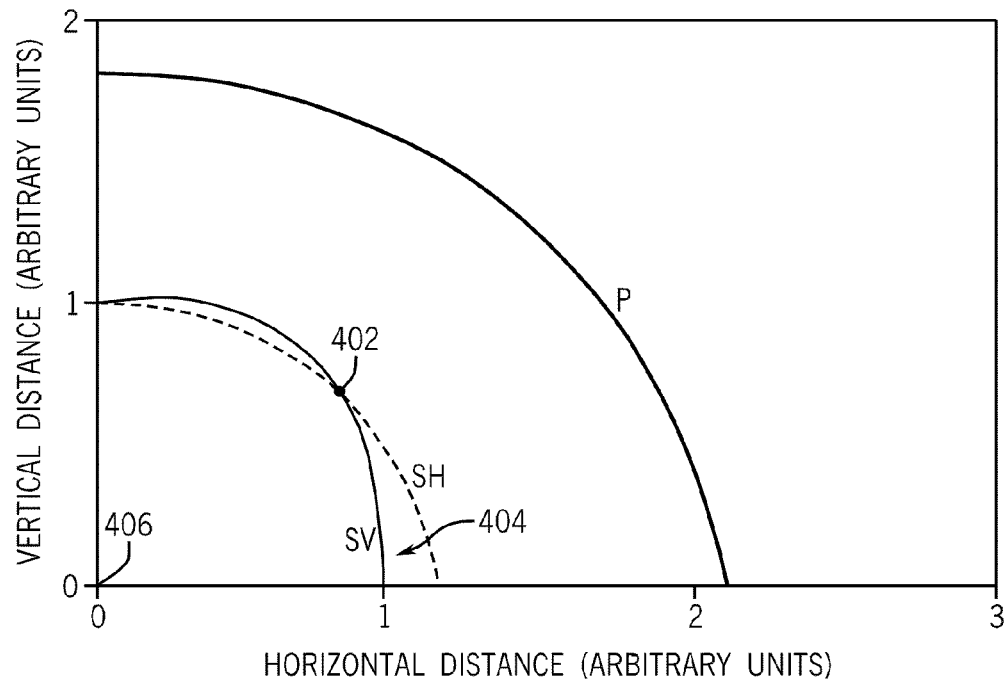
FIG. 4 is a comparison of SH, SV and P velocity behavior for elastic wave propagation in horizontally layered media.

Referring to FIG. 4, velocity behavior of SH and SV modes propagating through a layered Earth have been described by Levin, F., 1979, Seismic velocities in transversely isotropic media I: Geophysics, 44, 918-936 and Levin, F., 1980, Seismic velocities in transversely isotropic media II: Geophysics, 45, 3-17. The layered Earth is horizontally layered, vertical transverse isotropic (VTI) media. Note that at all take-off angles (except angle 402) SV and SH propagate with different velocities, with SH having a significantly faster velocity at shallow take-off angles (such as angle 404) from a source station 406. This wave physics will be useful when examining seismic test data described later.

Vertical-Force Sources and Direct-S Illumination

One type of source used in onshore seismic data acquisition applies a vertical displacement force to the Earth. Among these vertical-force sources are vertical weight droppers and thumpers, explosives in a shot hole, and vertical vibrators. Such sources are traditionally viewed as only P-wave sources, but they also produce robust S wavefields.

Figure 5:
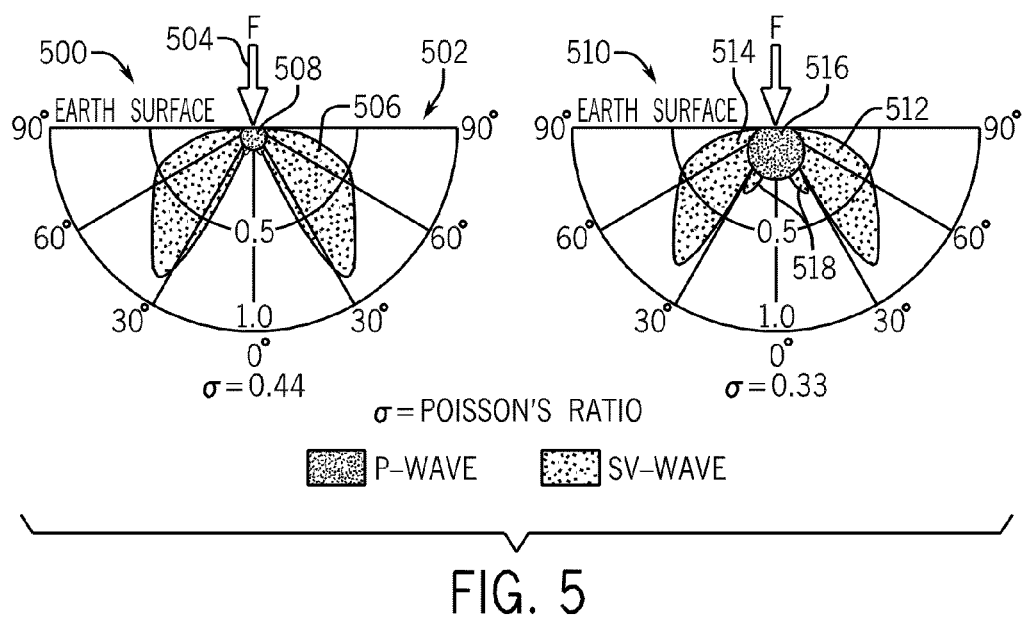
FIG. 5 is a cross-sectional view of a theoretical calculation of P and SV radiation patterns produced when a vertical force F is applied to the surface of the Earth, shown for two different values of the Poisson's ratio of the Earth layer, according to an exemplary embodiment.

Referring to FIG. 5, an illustration of a theoretical calculation, in cross-sectional views, is presented to illustrate how energy is distributed between P-wave and SV-shear mode radiation patterns when a vertical force is applied to an elastic half-space 502 from a vertical force source or vertical displacement source. See Miller, G., and H. Pursey, 1954, The field and radiation impedance of mechanical radiators on the free surface of a semi-infinite isotropic solid: Proc. Royal Soc. London, Series A, v. 223, p. 521-541 and White, J. E., 1983, Underground sound—applications of seismic waves: Elsevier Science Publishers. Calculations are shown for two different values of the Poisson's ratio of the Earth layer, with the first image 500 representing a Poisson's ratio of 0.44 and the second image 502 representing a Poisson's ratio of 0.33. This analysis focuses only on body waves and ignores horizontally traveling energy along the Earth-air interface. The semi-circles indicate the relative strength of the radiation. Radial lines define the take-off angle relative to vertical. In each model, more SV energy is generated than P energy.

The calculation of FIG. 5 shows that a vertical-force source 504 produces more SV energy 506 than P energy 508, and that at take-off angles of 20-degrees and more this direct-SV mode is significantly stronger than the P mode. This particular SV radiation may not result in a robust illumination of geology directly below the source station; whereas, its companion P radiation does. In order to take advantage of the direct-SV mode produced by vertical displacement onshore sources, two features can be implemented in data acquisition systems. First, three component (3C) geophones are used rather than single-component geophones. Second, longer recording times are used to accommodate the slower propagation velocity of the downgoing and upgoing direct-SV mode. For example, P-wave recording times of four seconds to six seconds may be extended to at least eight seconds or at least 12 seconds. Recording times for large offsets between source and receiver may be at least three times or at least four times the vertical travel time to the deepest target of interest. Modern seismic data acquisition systems can accommodate the long data-acquisition times required to image deep targets at far-offset receiver stations. A processing circuit within the data acquisition system may be configured to control the geophones or other receivers or sensors to listen or record received seismic data for at least a minimum recording time.

A definitive way to illustrate the P and direct-SV radiation produced by a vertical-displacement source is to analyze its downgoing wavefield using vertical seismic profile (VSP) data. One example of VSP data acquired in the Delaware Basin of New Mexico with a vertical vibrator used as a source is provided as FIG. 7A. The downgoing mode labeled SV is not a tube wave because it propagates with a velocity of approximately 2400 m/s (8000 ft/s), which is almost twice the velocity of a fluid-borne tube wave. The downgoing P and SV illuminating wavelets produced immediately at the point where this vibrator applies a vertical force to the Earth surface are labeled and extended back to the surface source station 700 to illustrate that an SV mode is produced directly at the source. The absence of data coverage across the shallowest 3000 ft of strata leaves some doubt as to where downgoing event SV is created, so a second example of VSP data produced by a vertical vibrator in a South Texas well is illustrated on FIG. 7B. Again this vertical-displacement source creates a robust direct-SV wavefield in addition to the customary P wavefield. In this example, the downgoing SV mode can be extended back to the source station at the Earth surface with confidence. In the case of FIG. 7B, the source was offset only 100 ft from the VSP well. The top diagram shows a vertical geophone response. The bottom diagram shows the response of a horizontal geophone.

Figure 7A:
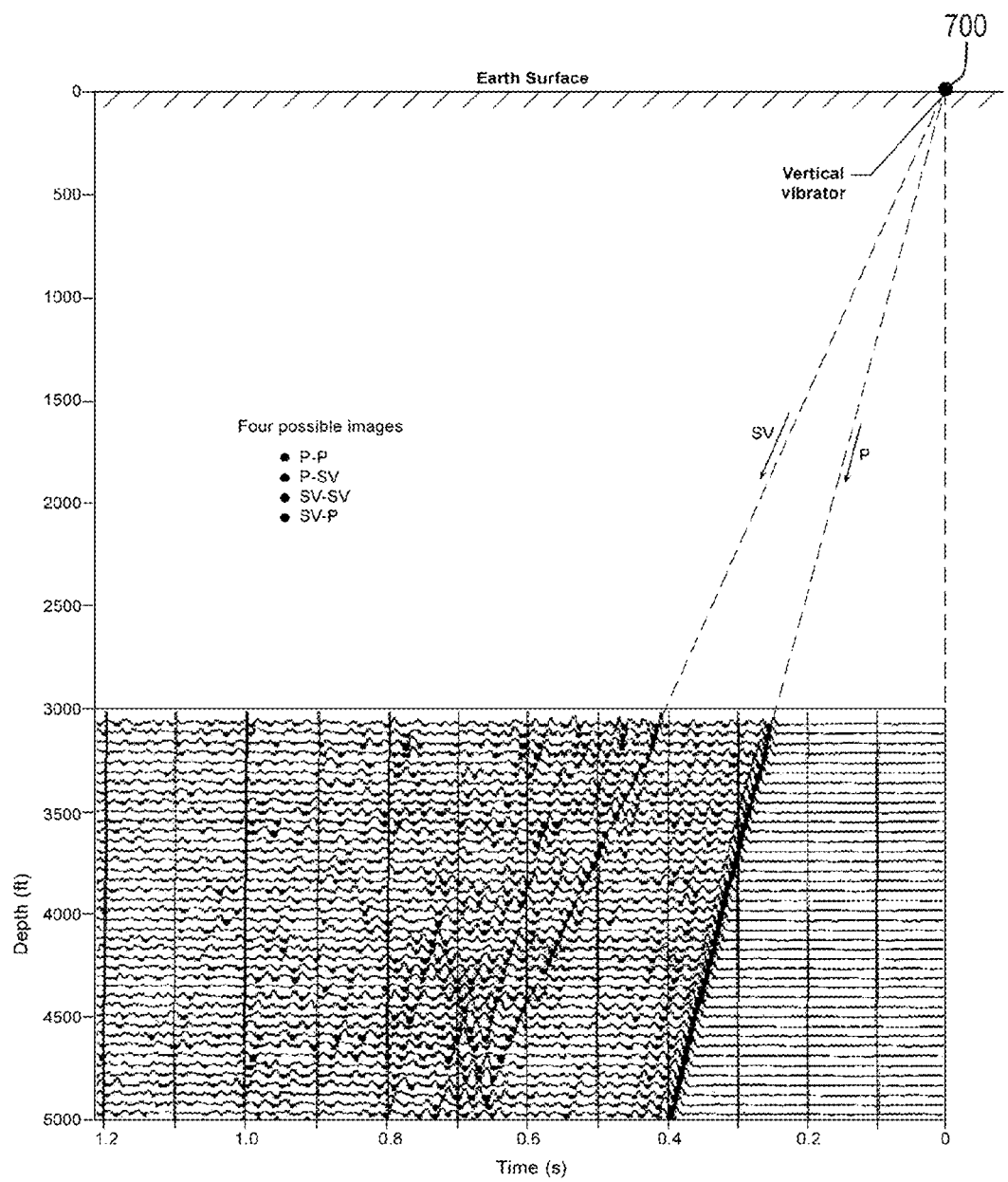
FIG. 7A is a chart of VSP data acquired using a vertical-displacement source, according to an exemplary embodiment.
Figure 7B:
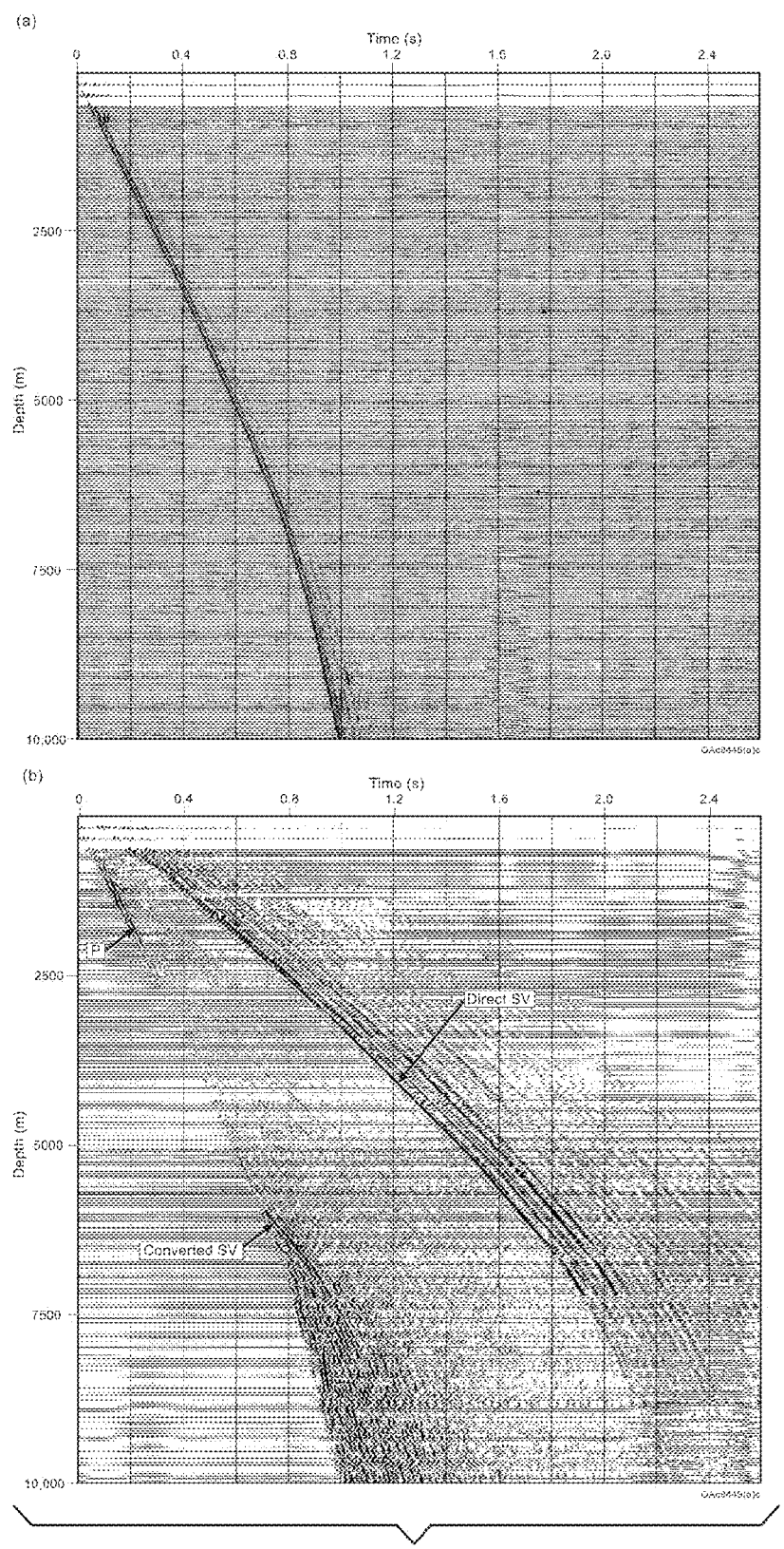
FIG. 7B is a chart of VSP data acquired using a vertical-displacement source, according to an exemplary embodiment.

The VSP data examples of FIGS. 7A and 7B show that a vertical vibrator is an efficient producer of direct-SV radiation and creates an SV-SV mode that can be utilized. An explosive shot also applies a vertical-displacement force to the Earth and generates a direct-SV mode.

The SV mode exhibited by the data in FIGS. 7A and 7B is produced at the same Earth coordinate as the P mode and is a source-generated direct-SV wave. The propagation medium at this location has unusually low $V_P$ and $V_S$ velocities. The SV mode produces a large population of upgoing SV reflections that are observable in these raw, unprocessed data.

The term "SV" is used above to describe the S-wave radiation. However, as will be seen below, the term "SV" should be replaced with the broader term "S", meaning the radiated S-wave energy is both SV and SH when the radiation is considered in a 3D context rather than as a single vertical profile.

Figure 6A:
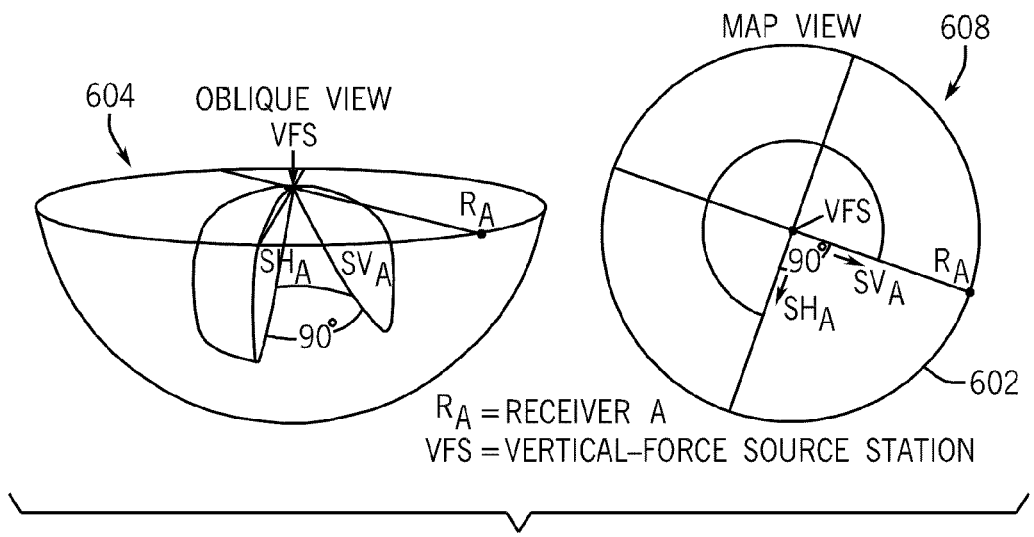
FIGS. 6A and 6B show an S-wave radiation pattern from FIG. 5 displayed as a 3D object, according to an exemplary embodiment.
Figure 6B:
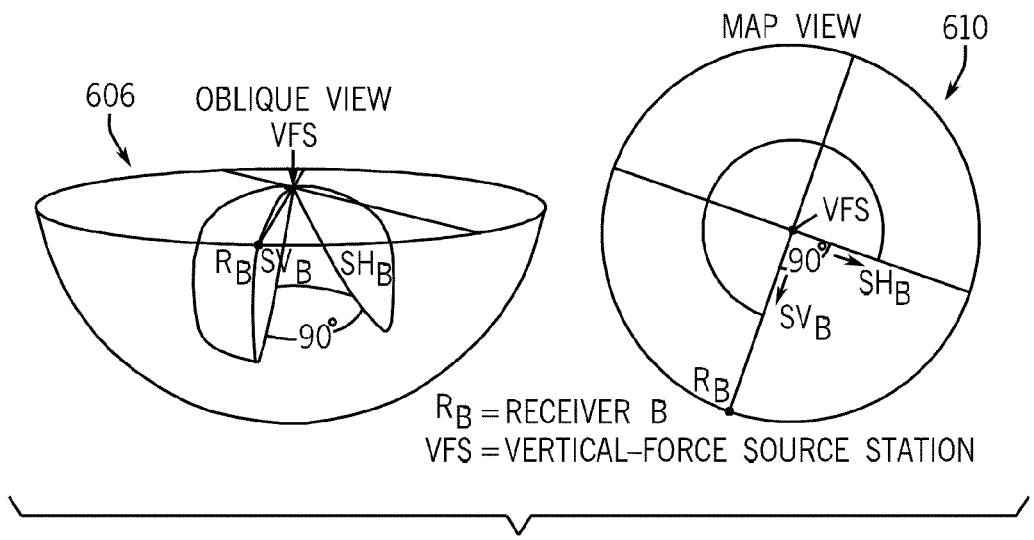

To illustrate the principle that S-wave radiation produced by a vertical-force source consists of both SV and SH modes, the pattern displayed on the right of FIG. 5 is converted to a 3D object and displayed as FIGS. 6A and 6B. For ease of understanding, the 3D radiation pattern is simplified to contain only the major S lobe 512, 514. Both the P-wave component 516 and the smaller secondary S lobe 518 seen on FIG. 5 are omitted. The solid is further altered by removing a 90-degree section 602 to allow better viewing of the 3D geometry by which S energy spreads away from the vertical-force source station VFS.

In FIG. 6A, SV and SH planes and displacement vectors are shown relative to a receiver station $R_A$. In FIG. 6B, SV and SH planes and displacement vectors are drawn relative to a receiver station $R_B$. These two arbitrary receiver stations $R_A$ and $R_B$, separated by an azimuth of 90 degrees, are positioned on the Earth surface around a station VFS where a vertical-force source is deployed. Oblique views and map views are shown of a vertical plane passing through the source station and each receiver station. This source-receiver plane is the SV plane for each receiver station. For each receiver, an SH plane is also shown perpendicular to each SV plane. The SH plane for receiver $R_A$ is the SV plane for receiver $R_B$, and inversely, the SH plane for receiver $R_B$ is the SV plane for receiver $R_A$. Regardless of where a receiver station is positioned in azimuth space away from a vertical-force station, both SV and SH modes will propagate to that station. SH shear information is available as is SV shear information when vertical-force source data are acquired.

Field Test

The Exploration Geophysics Laboratory (EGL) at the Bureau of Economic Geology initiated a field-test program to quantify the geometrical shapes and relative strengths of compressional (P)-wave and shear (S)-wave modes produced by a variety of seismic sources. The first test program was done at the Devine Test Site owned by The University of Texas at Austin and managed by EGL researchers. Sources deployed for this initial test were: 1-kg package of explosive positioned at a depth of 20 ft, a horizontal vibrator, a vertical vibrator, and an accelerated-weight that impacted the Earth vertically and at inclined angles.

Source-Receiver Geometry

Figure 8:
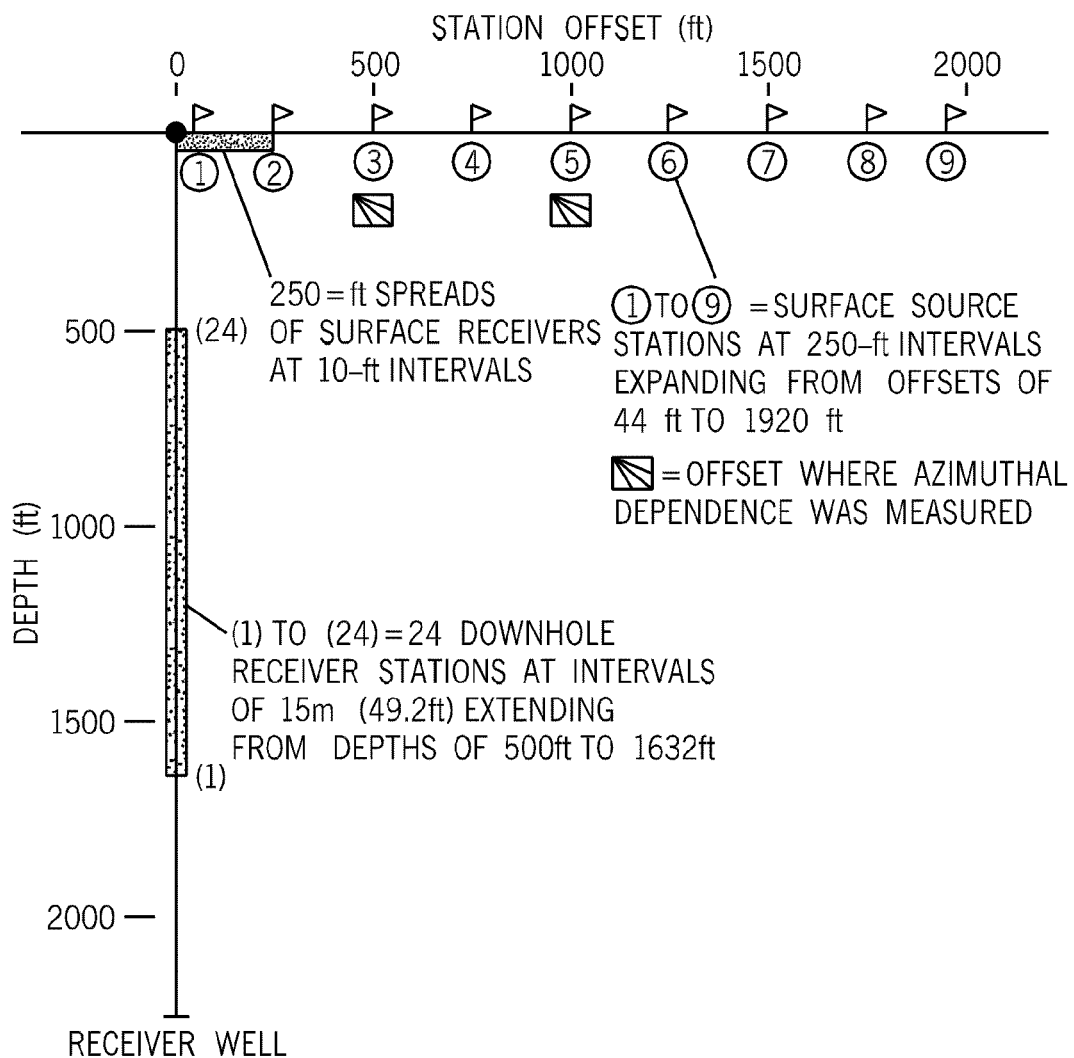
FIG. 8 is a diagram showing a source-receiver geometry used to analyze P and S radiation patterns emitted by seismic sources, according to an exemplary embodiment.

Referring to FIG. 8, an illustration of the source-receiver geometry is shown. The source-receiver geometry used to evaluate P and S source radiation patterns combined the concepts of horizontal wave testing (involving only a horizontal receiver array) and vertical wave testing (involving only a vertical receiver array) as described by Hardage, B. A., 2009, Horizontal wave testing: AAPG Explorer, v. 30, no. 12, p. 26-27 and Hardage, B. A. 2010, Vertical wave testing: AAPG Explorer, v. 31, no. 1, p. 32-33. A 24-station vertical array of three-component geophones was deployed in a selected test well, with receiver stations spanning a depth interval extending from 500 to 1632 ft (FIG. 8). Three-component (3C) geophones are configured to acquire all three dimensions of a full elastic wave. Several 25-station horizontal arrays of 3C sensors spaced 10 ft apart spanned the offset range 0 to 250 ft immediately next to the receiver well. Source stations were offset from the well at intervals of 250 ft, the linear dimension of the horizontal surface-receiver arrays.

Vertical Aperture

Figure 9:
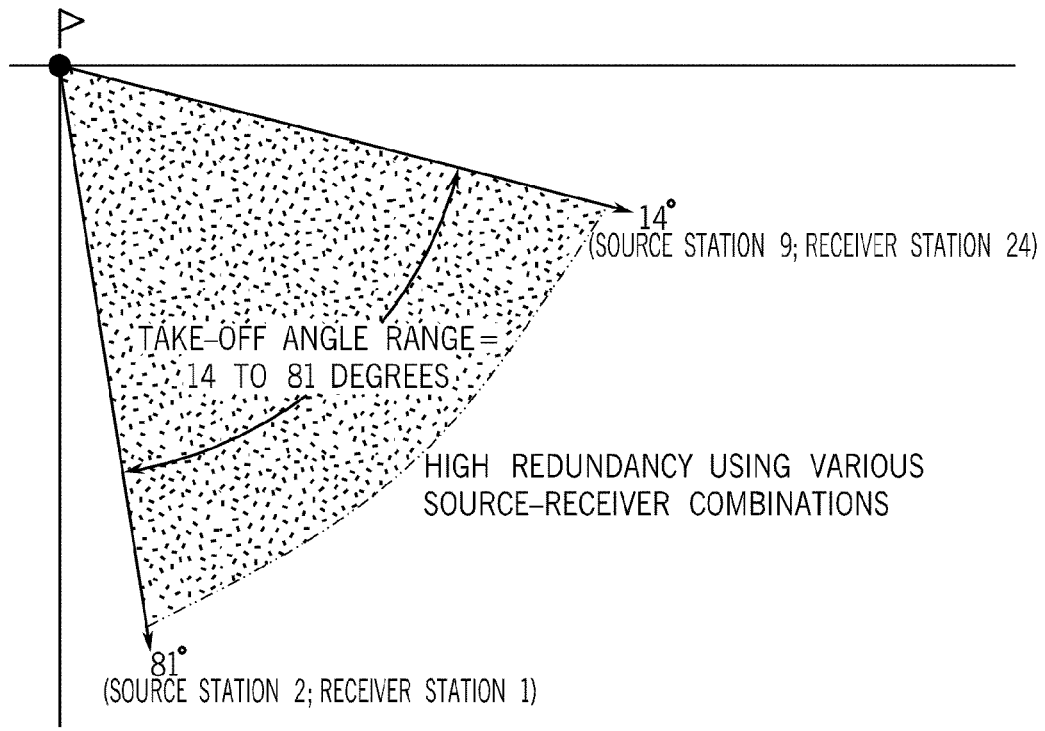
FIG. 9 is a diagram illustrating takeoff angle apertures, according to an exemplary embodiment.

Referring to FIG. 9, an approximation of the aperture range created by the source received source-receiver geometry is shown. Downgoing P and S modes were recorded over a wide aperture of vertical takeoff angles (14 degrees to 81 degrees in this example) from the surface source stations to define the geometrical shape of P and S radiation patterns in section view. The shallowest takeoff angle involved data generated at source station 9 (offset 1920 ft) and recorded at downhole receiver station 24 (depth of 500 ft). The steepest takeoff angle involved source station 2 (offset 250 ft) and downhole receiver station 1 (depth of 1632 ft). A first approximation of the aperture range created by the source-receiver geometry can be created by assuming straight raypaths from source to downhole receiver, which yields the result shown in FIG. 9. In actual wave propagation, raypaths are curved as dictated by refractions at interfaces between velocity layers. Raypaths refract (bend) when they advance from an Earth layer having velocity V1 into a layer having velocity V2. Raypath curvature can be calculated if velocity layering is known. Straight raypath assumptions are used to explain the principles described with reference to FIG. 9.

Transforming VSP Data to Wave-Mode Data

In a vertical well, azimuth orientations of X,Y horizontal geophones deployed by twisted-wire cable differ at each downhole station because of receiver-module spin. As a result, phase shifts and amplitude variations introduced into data by station-to-station variations in receiver orientation do not allow individual events or distinct wave modes to be recognized, particularly S-wave events that tend to dominate horizontal-sensor responses. In this case, receivers are mathematically oriented to specific azimuths and inclinations to define downgoing and upgoing P and S modes.

Figure 10:
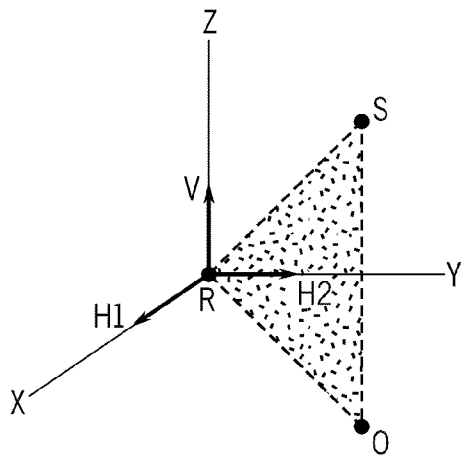
FIG. 10 is a diagram illustrating transformation of X, Y, Z receiver to P, SV, SH receivers, according to an exemplary embodiment.
Figure 10:
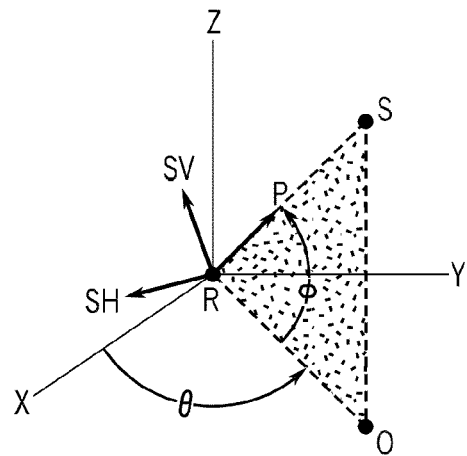

Referring to FIG. 10, a graphical description of the transformation of receivers from X, Y, Z data space to P, SV, SH data space is shown. Transformations of borehole receivers from in situ X, Y, Z orientations to a data space where receivers are oriented to emphasize P, SV, and SH events have been practiced in vertical seismic profiling (VSP) technology. DiSiena, J. P., Gaiser, J. E., and Corrigan, D., 1981, Three-component vertical seismic profiles—orientation of horizontal components for shear wave analysis: Tech. Paper S5.4, p. 1990-2011, 51$^{st}$ Annual Meeting of Society of Exploration Geophysicists. Hardage, B. A., 1983, Vertical seismic profiling, Part A, principles: Geophysical Press, 450 pages (The VSP Polarization Method for Locating Reflectors, pages 307-315). Examples of this receiver orientation procedure applied to vertical-impact, shot-hole explosive, and vertical-vibrator sources at selected source stations are illustrated on FIGS. 11, 12, and 13, respectively. Data windows spanning 100 ms immediately following the onset of interpreted P-wave direct arrivals were used to determine azimuth and inclination angles θ and Φ (FIG. 10) at each receiver station FIG. 10 illustrates a 2-step rotation of coordinate axes to determine directional angles from a subsurface receiver to a surface-positioned seismic source. When a 3-component sensor is lowered several hundreds of feet down a well, the azimuth orientations of horizontal sensors are not known because the receiver package rotates on the twisted wire cable used for deployment. As a consequence, P, SH, and SV modes are intermingled on each sensor response because sensors are not oriented in the directions of P, SV, and SH particle displacements. Therefore, each subsurface receiver is mathematically oriented so that one sensor points directly along the raypath of the downward traveling P wave from a surface source. Once such rotation is done, the sensor pointing at the source is dominated by P data, the second sensor in the same vertical plane as the P sensor (this vertical plane passes through the source and receiver stations) is dominated by SV, and the third sensor (perpendicular to this vertical plane) is dominated by SH. Two angles—a horizontal rotation angle θ and a vertical rotation angle Φ—have to be determined to achieve this sensor orientation.

To determine horizontal azimuth angle θ (FIG. 10), data are analyzed in a short time window spanning only the downgoing P-wave first arrival from the source. Only responses of the two horizontal sensors X and Y are analyzed in this first rotation step. Data acquired by sensors X and Y are mathematically transformed to responses that would be observed if these two orthogonal sensors were rotated to new coordinate axes that are successively incremented by one-degree of azimuth. This rotation is done 180 times to create sensor responses that allow the sensor axes to point over an azimuth range of 180 degrees from the unknown azimuth in which the sensors actually point. When sensor X is positioned in the vertical plane passing through the receiver and the source, the response of the X sensor will be a maximum, and the response of the Y sensor will be a minimum. When this maximum-X and minimum-Y response is found, the angle between the in situ sensor axes and the desired rotated axes that isolate P, SV, and SH wave modes is θ.

To determine inclination angle Φ (FIG. 10), the sensor responses after transforming the data to coordinate axes oriented in azimuth θ are then analyzed in the short data window spanning only the downgoing P-wave first arrival, as defined in this new data-coordinate space. Data from only sensor Z (vertical) and from the new X sensor that has been rotated into the vertical source-receiver plane are used in this second rotation. In this second axis rotation, these two sensor responses are mathematically transformed to responses that would be observed if these two sensors were tilted in successive inclinations of one degree of tilt over a tilt range of 90 degrees. When the Z receiver is pointing in the direction of the incoming P-wave first arrival, its response will be a maximum, and the companion sensor in the same vertical plane (the new rotated and tilted X sensor) response will be a minimum. When this condition is found, angle Φ has been defined.

Data transformed to this second coordinate system defined by an azimuth rotation of θ and an inclination angle of Φ have optimal separation of P, SV, and SH modes, with P, SV, and SH being the dominant data on the rotated and tilted Z, X, and Y sensors, respectively.

Figure 11:
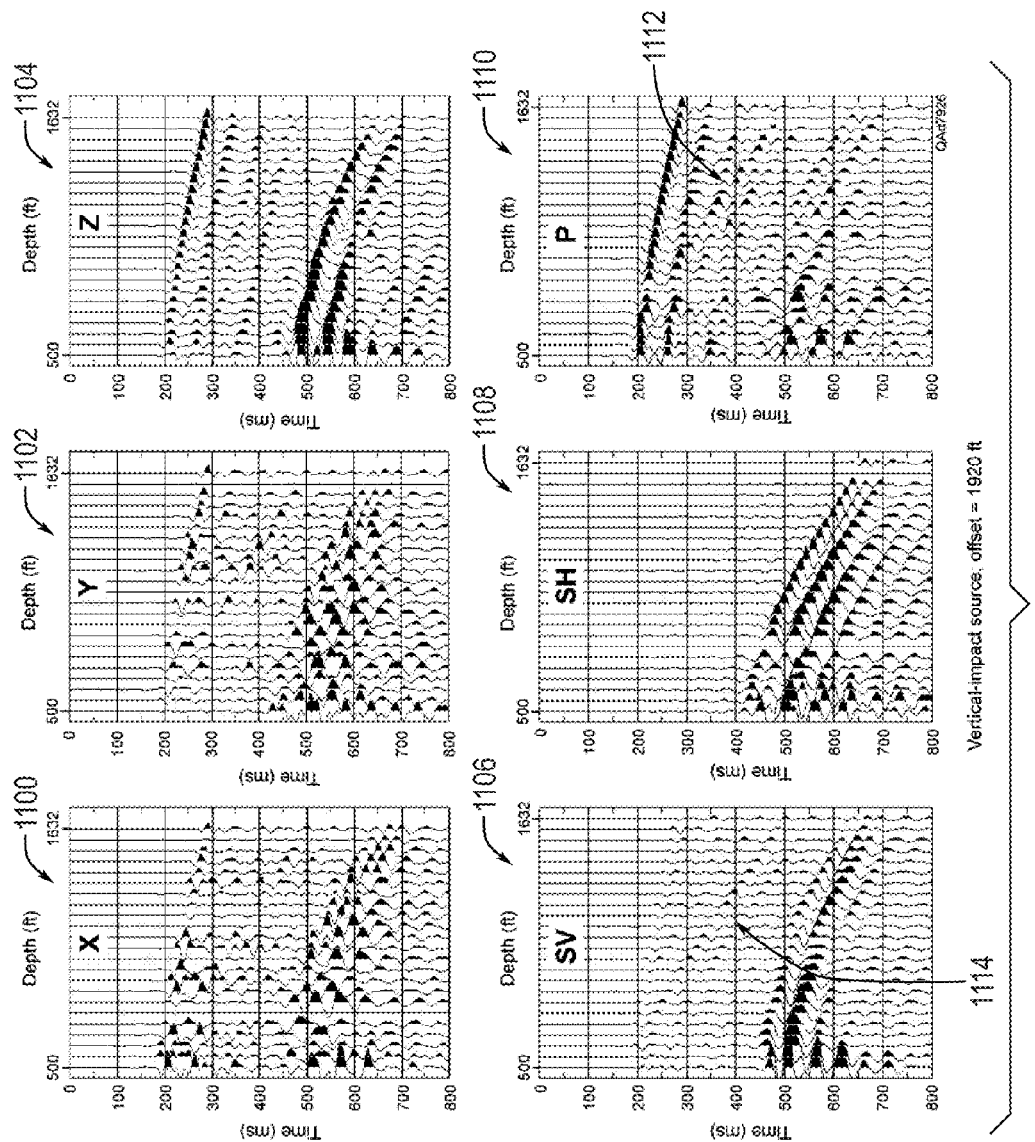
FIG. 11 is a set of charts showing example X, Y, Z data acquired with a vertical array from a vertical-impact source, and corresponding data rotated to P, SV and SH data space, according to an exemplary embodiment.

Referring to FIG. 11, charts 1100, 1102 and 1104 illustrate X, Y, Z data acquired at the Devine Test Site with the vertical receiver array when a vertical-impact source was positioned at source station 9, offset 1920 ft from the receiver array. Charts 1106, 1108 and 1110 illustrate the same data rotated to P, SV, SH data space. No P or SV events appear on the SH data panel. Because SH displacement is orthogonal to both P and SV displacements, the absence of P and SV events defines SH data. SV events appearing on the P data panel such as the event shown at 1112 are downgoing P-to-SV conversions. Downgoing P-to-SV conversions are caused only by nonnormal incidence of a P wave on an impedance contrast interface. P and SV modes exchange energy freely when reflecting and refracting at interfaces because the displacement vectors of these two modes are in the same vertical plane. Neither P nor SV can convert energy to SH, and conversely SH can not convert into P or SV, because SH displacement is orthogonal to the vertical plane in which P and SV propagate. To confirm that a data panel is an SH mode, we search for evidence of P and SV events embedded in the data panel. If no P or SV events can be identified, the mode is pure SH, by definition. Note at shallow take-off angles (top 4 or 5 receiver stations), SH waves travel faster than SV waves as predicted by Levin (1979, 1980), supra, and measured by Robertson, J. D. and D. Corrigan, 1983, Radiation patterns of a shear-wave vibrator in near-surface shale: Geophysics, 48, 19-26.

SV waves produced directly at the source means SV waves are generated exactly at the point where a vertical force is applied to the Earth. There does not have to be an impedance-contrast interface close to the source to cause SV to come into existence. SV will propagate away from a vertical-force source even in a thick, homogeneous medium in which there are no interfaces.

In contrast, P-to-SV conversions occur only at interfaces where there is an impedance contrast. Any time a P-wave arrives at an interface at any incident angle other than 0 degrees (normal to the interface), some of the illuminating P energy converts into reflected and refracted P, and some converts into reflected and refracted SV. Thus P-to-SV conversion occurs at interface coordinates remote from a source, not directly at the source point. A converted SV mode requires two conditions be present: 1) an interface across which there is a contrast in acoustic impedance, and 2) a P-wave raypath arriving at that interface at an angle that is not normal to the interface. When the incident angle is 0 degrees (raypath perpendicular to the interface), the P-to-SV reflection coefficient is zero. At other incident angles, the P-SV reflection coefficient is non-zero.

Figure 12:
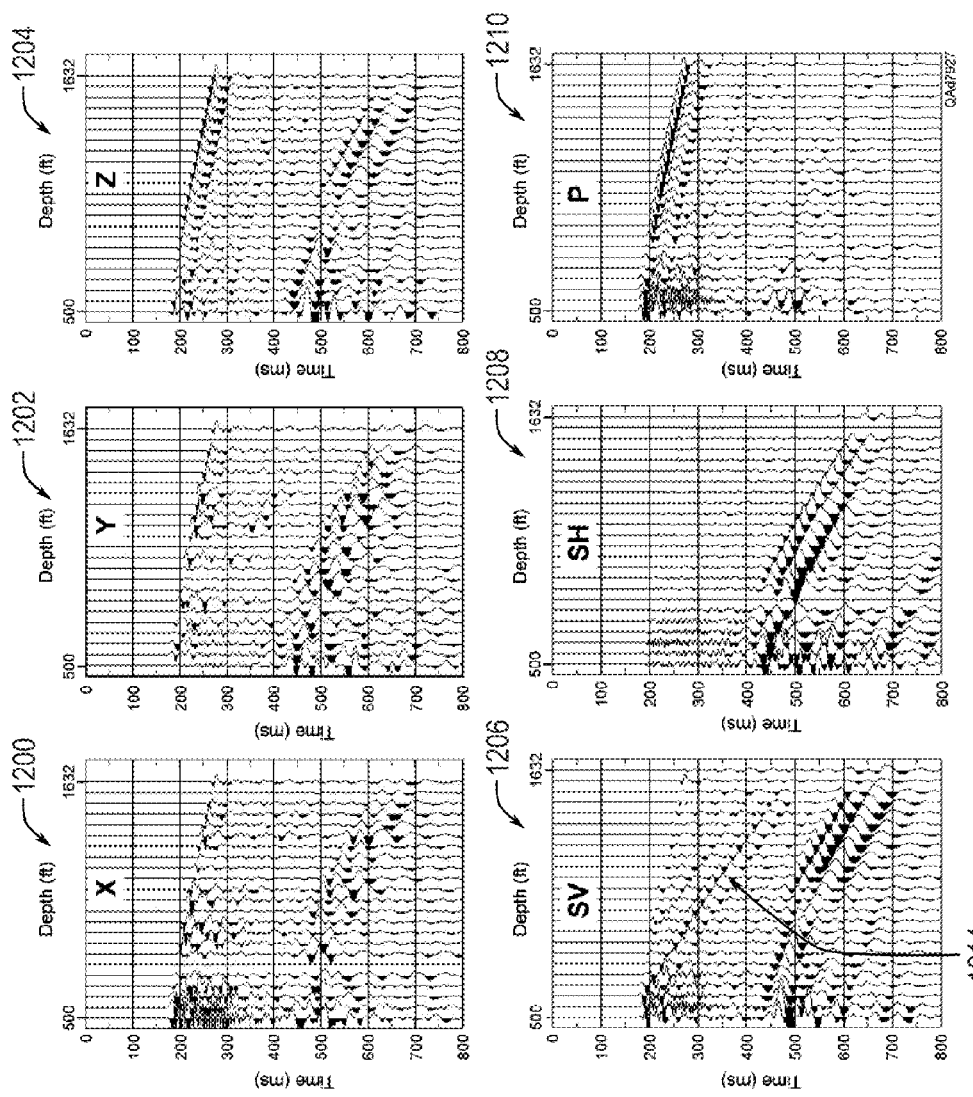
FIG. 12 is a set of charts showing example X, Y, Z data acquired with a vertical array from a shot hole explosive source, and corresponding data rotated to P, SV and SH data space, according to an exemplary embodiment.

Referring to FIG. 12, charts 1200, 1202 and 1204 illustrate actual X, Y, Z data acquired at the Devine Test Site with the vertical receiver array when a shot-hole explosive source was positioned at source station 5, offset 1250 ft from the array. Charts 1206, 1208 and 1210 illustrate the same data rotated to P, SV, SH data space. No P or SV events appear on the SH data panel. SV events appearing on the P data panel are weaker than is the case for a vertical-impact source, perhaps due to more accurate receiver rotations. Note at shallow take-off angles (top 4 or 5 receiver stations), SH waves travel faster than SV waves as predicted by Levin (1979, 1980), supra, and measured by Roberson and Corrigan (1983), supra.

Figure 13:
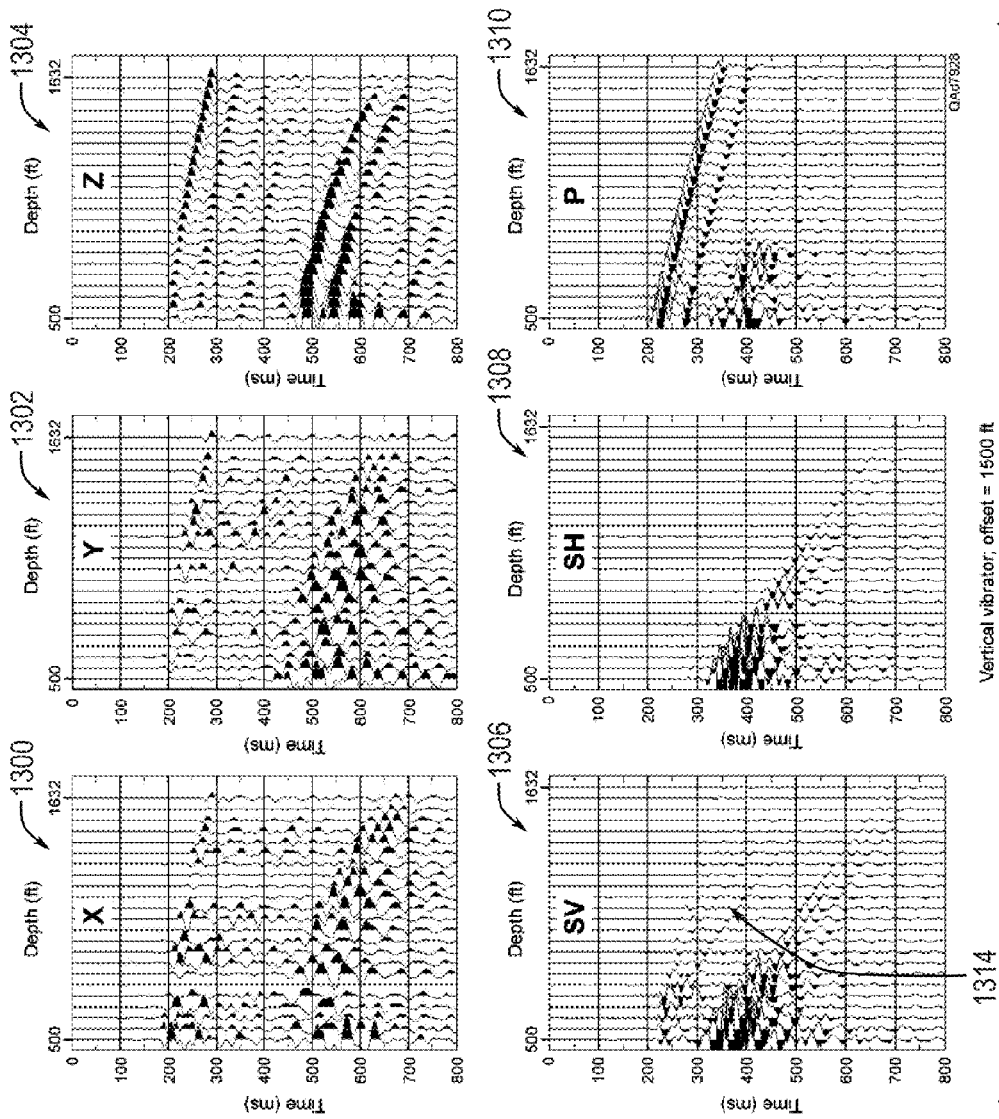
FIG. 13 is a set of charts showing example X, Y, Z data acquired with a vertical array from a vertical vibrator source, and corresponding data rotated to P, SV and SH data space, according to an exemplary embodiment.

Referring to FIG. 13, charts 1300, 1302 and 1304 illustrate actual X, Y, Z data acquired at the Devine Test Site with the vertical receiver array when a vertical-vibrator source was positioned at source station 6, offset 1500 ft from the array. Charts 1206, 1208 and 1210 illustrate the same data rotated to P, SV, SH data space. No P or SV events appear on the SH data panel. Measurements made at shallow take-off angles have larger amplitudes than measurements made with vertical-impact and explosive sources (FIGS. 11 and 12).

Although vertical-force source data do not produce the same S-wave data polarities as conventional horizontal-force sources, data polarity reversals, corrections, inversions or adjustments in appropriate portions of seismic image space transform vertical-force polarities to horizontal-force polarities. After these polarity adjustments, vertical-force source data can be processed just as horizontal-force source data are, using known algorithms.

A constant plot gain is applied to each data panel on each of FIGS. 11-13. Thus, within individual figures, P, SV, and SH amplitudes can be compared visually to judge relative energy levels of P and S modes. Such comparisons confirm SV and SH modes radiating away from a vertical-force source have amplitudes greater than the associated P mode. Data-display gains differ for each source, so P and S amplitudes produced by explosives should not be visually compared with P and S amplitudes produced by vertical-impact or vertical-vibrator sources.

According to theory, SH data do not convert to either P or SV modes as an elastic wavefield propagates through a layered Earth, and conversely, P and SV modes do not convert to SH modes. No SH data panel contains P or SV events, which indicate the wavefield separations displayed on FIGS. 11 through 13 are properly done. Theory also establishes energy is freely exchanged between P and SV modes as they propagate through layered media. All SV data panels on FIGS. 11-13 show P-to-SV conversion events 1114, 1214, and 1314, which again indicate correct wave physics. Although minor amounts of SV energy remain on the P data panels, we consider our wave-mode separation to be sufficiently accurate to establish the fundamental principle that both SH and SV shear modes are produced by a vertical-force source in addition to the expected P-wave mode.

Another piece of evidence confirming the two S modes shown on FIGS. 11 to 13 are SV and SH is the fact the wavefront labeled SH travels faster at shallow (near horizontal) takeoff angles than does the wavefront labeled SV. This distinction in SH and SV velocity behavior is emphasized by the theory documented by Levin (FIG. 4). The differences in SH and SV velocities is best seen by comparing the arrival times of S wavefronts on FIGS. 11 and 12 at shallow receivers positioned over the depth interval 500 to 700 ft.

Data Processing

There is a difference between S-wave source displacement vectors produced by vertical-force sources and conventional horizontal-force sources. The S-wave displacement applied to the Earth by a horizontal-force source is shown on FIG. 3. That displacement is oriented in a fixed azimuth direction (e.g., indicated by arrow 306), and Earth displacements around the point of application all point in the same direction (e.g., as indicated by arrows 308) as the direction of the applied force. In contrast, the S displacement created by a vertical-force source points in every azimuth direction around its point of application, and the corresponding Earth displacement vectors likewise point in all azimuth directions away from the source station (see FIG. 6). The effect seen in seismic reflection data is that S-wave data produced by a dipole source (FIG. 3) have the same polarity in every azimuth quadrant surrounding a source station, but S-wave data produced by a vertical-force source have different polarities when viewed in azimuth directions that differ by 180 degrees.

S-wave data-processing strategies across the seismic industry are based on the assumption that data polarities are constant across the entirety of seismic image space. Thus the polarities of S-wave data acquired with a vertical-force source can be adjusted to look like constant-polarity data produced by a dipole source via a data-polarity adjustment.

Figure 14:
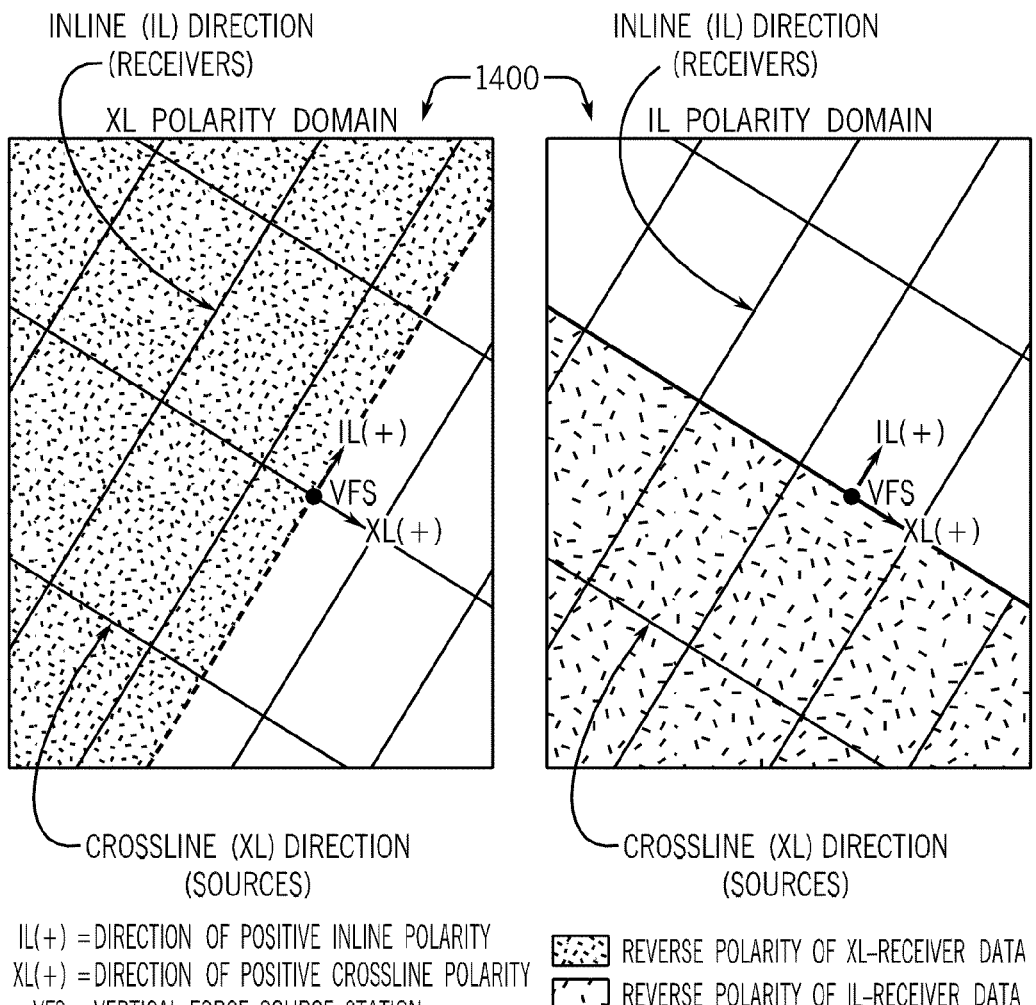
FIG. 14 is an illustration of the principle of data-polarity reversals applied to vertical-force source data to create constant-polarity S-wave data across seismic image space, according to an exemplary embodiment.

Referring to FIG. 14, a process of data-polarity adjustment will be described. FIG. 14 shows a map view of a vertical-force source station VFS positioned in a 3D seismic data-acquisition grid 1400. In seismic parlance, the direction receiver lines are deployed is called "inline," and the direction source lines are oriented is called "crossline." In most 3D seismic data-acquisition designs, inline and crossline directions are perpendicular to each other.

The azimuth direction of positive polarity in crossline and inline directions is arbitrary. However, once a data processor selects certain inline and crossline directions as being positive polarities, he/she has automatically divided inline and crossline seismic image space around a vertical-force source station into two polarity domains—a positive-polarity domain and a negative-polarity domain. FIG. 14 illustrates the principle of data-polarity reversals applied to vertical-force source data to create constant-polarity S-wave data across seismic image space. An exemplary 3D seismic data-acquisition geometry called orthogonal geometry is shown in which source line and receiver lines are orthogonal to each other. VFS is a vertical-force station on one source line. A positive-polarity direction is selected (arbitrarily) for both the crossline (source line) direction and the inline (receiver line) direction. This decision divides seismic image space into two domains—a positive-polarity domain and a negative-polarity domain.

Figure 15:
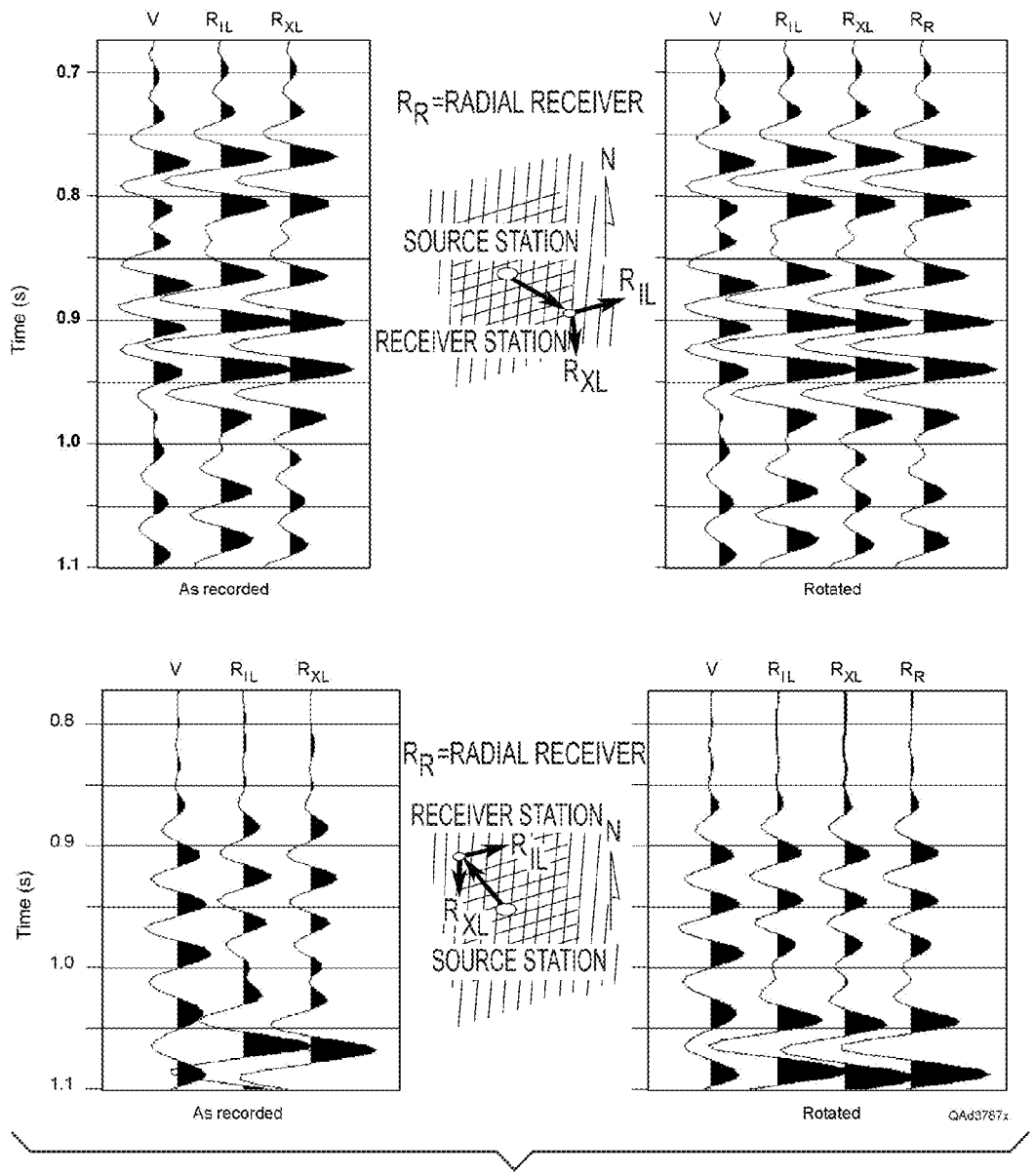
FIG. 15 illustrates a first example of polarities of vertical-force seismic data and the result of reversing polarities in the negative-polarity domain to convert vertical-force source data to constant-polarity dipole-source data, according to an exemplary embodiment.
Figure 16:
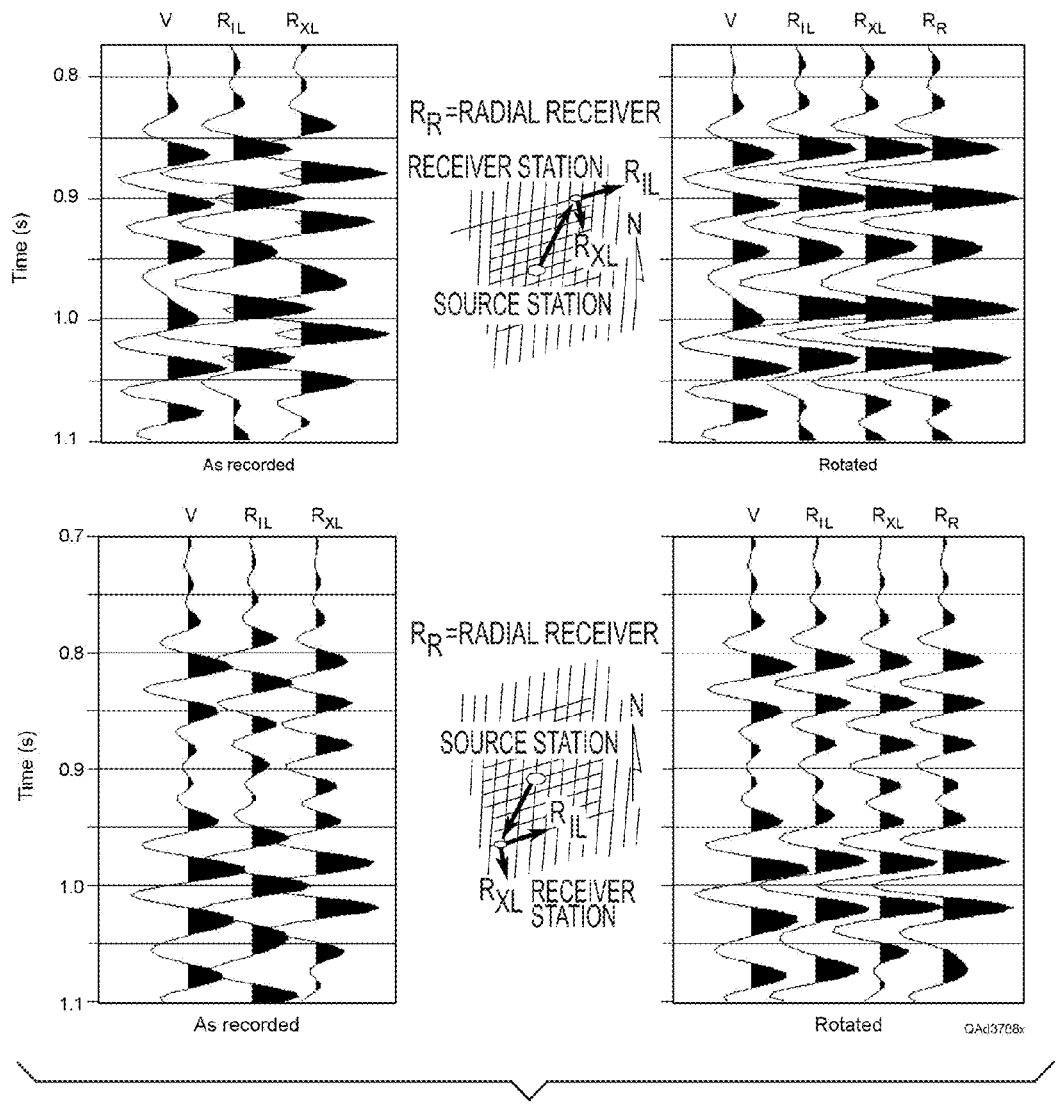
FIG. 16 illustrates a second example of polarities of vertical-force seismic data and the result of reversing polarities in the negative-polarity domain to convert vertical-force source data to constant-polarity dipole-source data, according to an exemplary embodiment.

A real-data example of this data-polarity principle is illustrated in FIGS. 15 and 16. These 3D seismic data were acquired using a vertical vibrator. The data-acquisition grid is shown between each pair of data panels to define the position of a fixed source station and various receiver stations where data produced by this vertical-force source were recorded. The positive inline (IL) and crossline (XL) directions assigned to the grid are indicated at each receiver station. The wiggle trace displays on the left show the polarities of the recorded data. Wiggle trace displays on the right show the data after polarity reversals have been applied as described in FIG. 14. After these polarity flips, all data have consistent polarity across the entirety of seismic image space and can be processed by standard seismic software.

The data processing for SV and SH wave modes produced directly at the point of application of a vertical-force source differs from that of processing converted-SV data. With direct-source data, data polarities are reversed in the negative-offset domain, and once this data-polarity correction is done, data in the two offset domains are processed as a single data set, not as two separate data sets. Direct-source S-wave data can be processed with common-midpoint (CMP) strategies; whereas, P-SV data are processed with common-conversion-point (CCP) strategies. Velocity analyses of data are done differently in these two data-processing domains—common midpoint versus common conversion point.

FIG. 15 illustrates a first example of polarities of vertical-force seismic data recorded in azimuth directions that differ by 180 degrees away from a source station (left). On the right, FIG. 15 illustrates the result of reversing polarities in the negative-polarity domain to convert vertical-force source data to constant-polarity dipole-source data.

FIG. 16 illustrates a second example of polarities of vertical-force seismic data recorded in azimuth directions that differ by 180 degrees away from a source station (left). On the right, FIG. 16 illustrates the result of reversing polarities in the negative-polarity domain to convert vertical-force source data to constant-polarity dipole-source data.

Findings

The EGL test data show that vertical-force sources, commonly perceived as P-wave sources, generate more S energy directly at the force application point than they do P energy. In one embodiment, the S energy is generated directly at the force application point of the source, rather than through applications of P-to-SV mode conversions at sub-surface interfaces.

In addition, field tests show vertical-force sources produce a high-energy, high-quality SH mode directly at the source station in addition to an SV mode. This statement is confirmed by:

The mode claimed to be SH produces an Earth displacement normal to the SV mode, and Has a velocity greater than the SV mode at shallow takeoff angles.

Thus, the EGL source test program evidences that full-elastic-wavefield data (P, SV, SH) can be acquired using vertical-force sources.

The existence of SV mode data directly at the source station can be contrasted with SV data which is converted at impedance-contrast interfaces in the Earth from P to SV mode by some layers of media below the Earth's surface, which can be referred to as "near the source." There are only two ways to generate an SV shear mode: 1) use a source that produces an SV displacement directly at the source station, or 2) use a source that generates a robust P wave and utilize the converted SV modes that P wave produces when it illuminates an interface at any incident angle other than 0 degrees.

As explained above, SH data are observed in data produced by the three general types of vertical-force sources (vertical vibrator, vertical impact, shot hole explosive), which means an SH displacement occurs directly at the point where a vertical-force source applies its force vector to the Earth.

Data Acquisition and Processing

Figure 17:
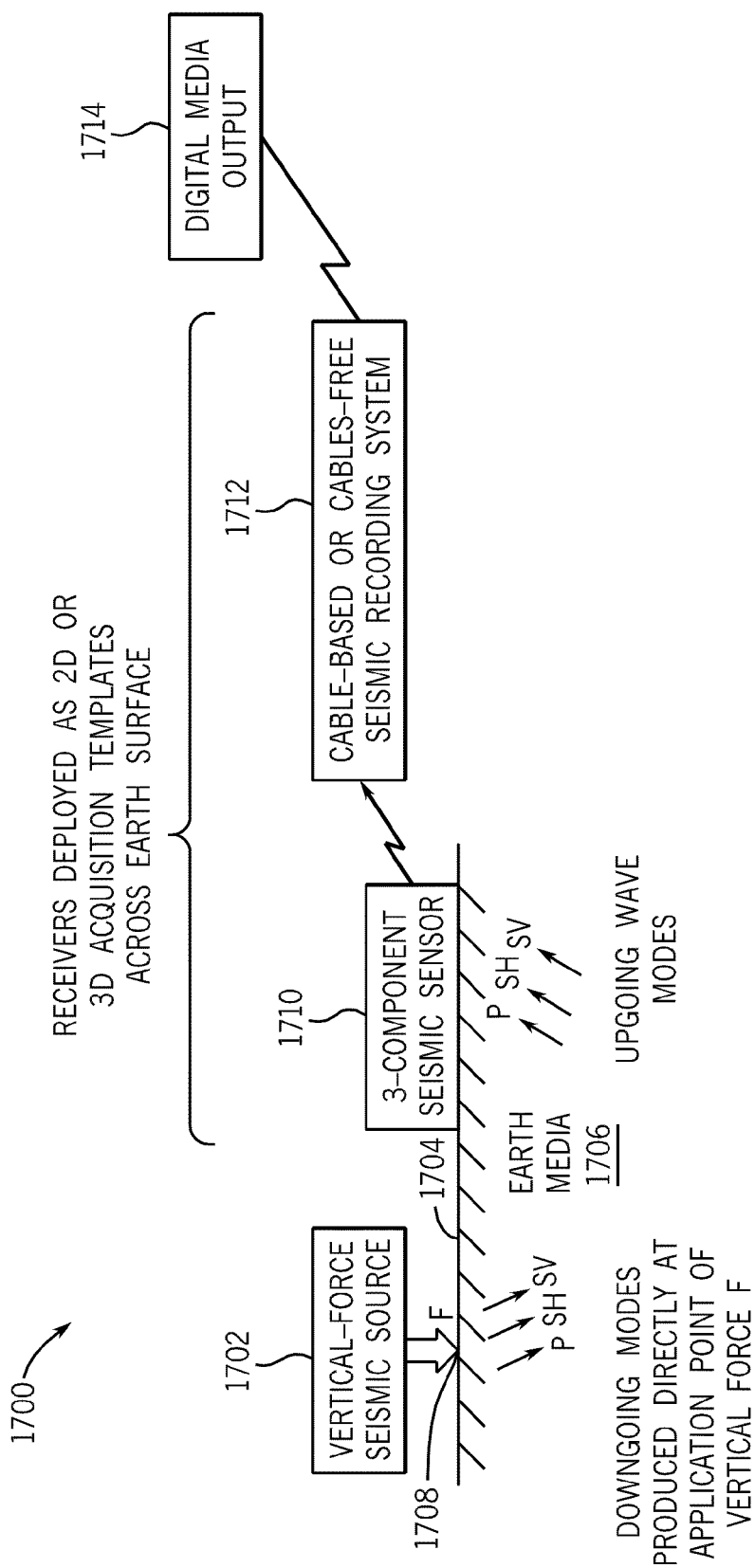
FIG. 17 is a block diagram of a data acquisition and processing system and method for acquiring and processing full elastic waveform data from a vertical-force source using surface-based sensors, according to an exemplary embodiment.

Referring now to FIG. 17, a diagram of a data acquisition and processing system 1700 and method for acquiring and processing full elastic waveform data from a vertical-force source using surface-based sensors will be described. A vertical-force seismic source 1702 is disposed on, near, or within a shallow recess of the Earth's surface 1704. Source 1702 is configured to impart a vertical-force to surface 1704 to provide seismic waves into Earth media 1706. Source 1702 may comprise a vertical vibrator, shot-hole explosive, vertical-impactor, air gun, vertical weight-dropper or thumper, and/or other vertical-force sources. In this example, vertical-force source 1702 produces compressional P mode and both fundamental shear modes (SH and SV) in Earth 1706 directly at a point of application 1708 of the vertical-force source. In this embodiment, at least some of the SH and SV shear waves are generated at source 1702 and not by subsurface conversion caused by portions of Earth media 1706. The frequency waves may be provided in a frequency sweep or a single broadband impulse. A vertical-force source may be used without any horizontal-force sources.

A seismic sensor 1710 is along the Earth's surface, which may include being disposed on, near, or within a recess of the Earth's surface 1704. For example, in one embodiment, shallow holes may be drilled and sensors 1710 deployed in the holes to avoid wind noise, noise produced by rain showers, etc. Sensor 1710 is configured to detect or sense upgoing wave modes, reflected from subsurface sectors, formations, targets of interest, etc. In this embodiment, sensor 1710 comprises a multi-component geophone, for example a three-component geophone configured to sense compressional P mode and both fundamental shear modes (SH and SV). As described in FIGS. 1-14, various arrays and configurations of sources 1702 and sensors 1710 may be implemented in different embodiments. For example, two-dimensional or three-dimensional acquisition templates may be deployed across Earth's surface 1704. As another example, a plurality of sources 1702 (e.g., at least two, at least five, at least ten, etc.) may be disposed along a line and be configured to transmit seismic waves together or simultaneously. Vertical seismic profiling may be used in one embodiment. In an alternative embodiment, a reverse vertical seismic profiling arrangement may be used, in which one or more sources is disposed in a hole or well and one or more 3-component sensors or receivers are disposed along the Earth's surface. In another alternative embodiment, an interwell arrangement may be used, in which sources are disposed in one well or hole and 3-component receivers or sensors are disposed in another well or hole. An in-hole source may be a wall-locked mechanical vibrator in an air-filled or fluid-filled well, or an air gun, water gun, or high-energy piezo-ceramic transducer freely suspended in a fluid column, or other source.

A seismic recording system 1712 is configured to receive seismic data sensed by sensor(s) 1710 via a wired or wireless communication link and to store the data in a database. System 1712 may comprise any type of computing device. System 1712 may be configured to acquire and/or process the received data. For example, processing may comprise polarity-reversal as previously described, the processing steps of FIG. 18 below, or other seismic data processing algorithms.

A digital media output device 1714 may be coupled to system 1712, or data may be transferred to device 1714 from system 1712 using any of a variety of technologies, such as a wired or wireless network, memory device, etc. Device 1714 may comprise one or more of a display device, a printer, a speaker, and/or other output devices.

According to one embodiment, system 1712 can be configured to acquire or capture SH-SH mode data with surface-based sensors. According to another embodiment, system 1712 can be configured to acquire both SV and SH mode data with surface-based sensors.

Figure 18:
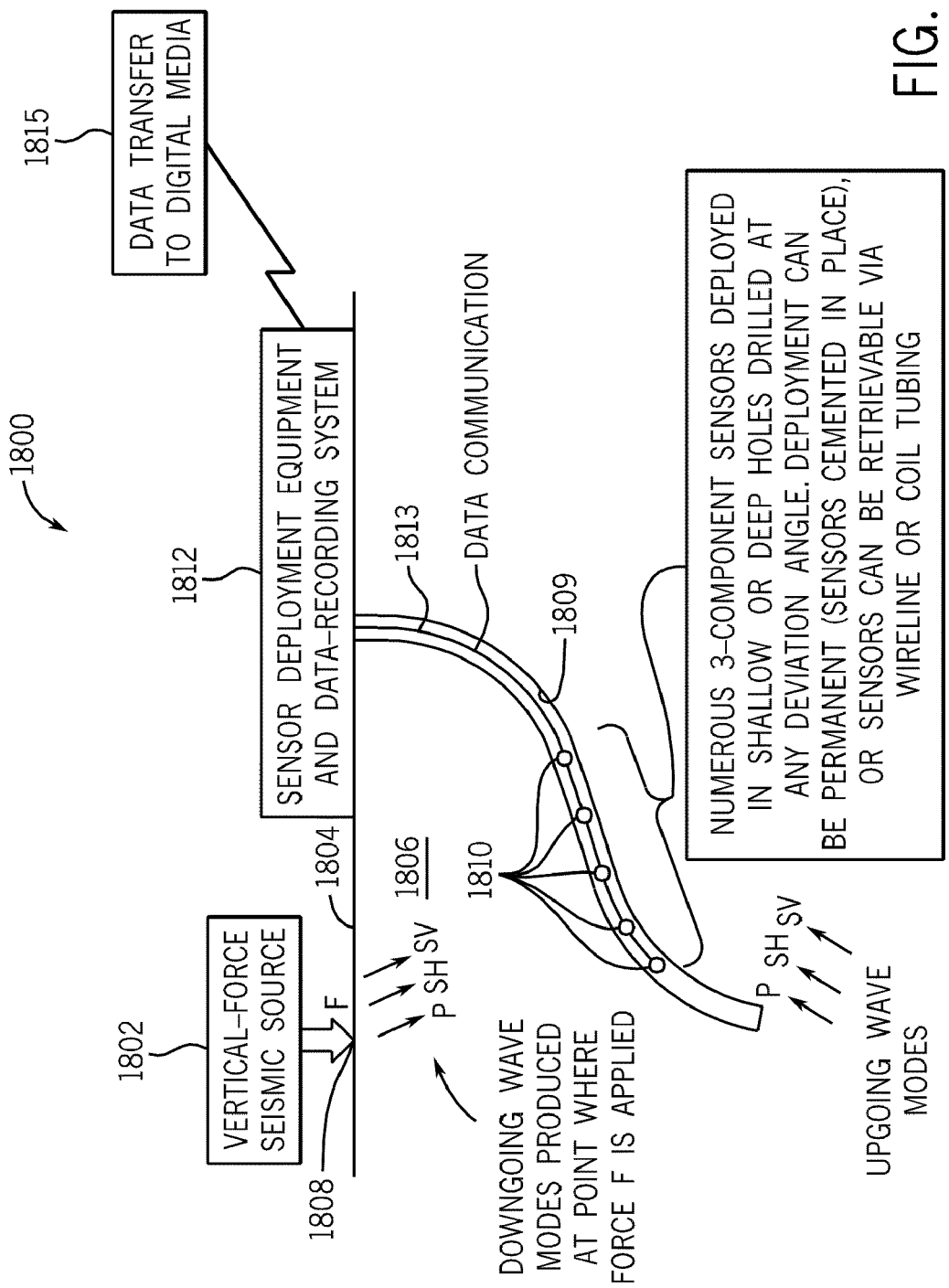
FIG. 18 is a block diagram of a data acquisition and processing system and method for acquiring and processing full elastic waveform data from a vertical-force source using subsurface sensors, according to an exemplary embodiment.

Referring now to FIG. 18, a diagram of a data acquisition and processing system 1800 and method for acquiring and processing full elastic waveform data from a vertical-force source using sub-surface sensors will be described. A vertical-force seismic source 1802 is disposed on, near, or within a shallow recess of the Earth's surface 1804. Source 1802 is configured to impart a vertical-force to surface 1804 to provide seismic waves into Earth media 1806. In this example, vertical-force source 1802 produces compressional P mode and both fundamental shear modes (SH and SV) in Earth 1806 directly at a point of application 1808 of the vertical-force source. In this embodiment, at least some of the SH and SV shear waves are generated at source 1802 and not by subsurface conversion caused by portions of Earth media 1706. Contamination of S data produced directly at a source station by converted-SV data produced at interfaces remote from the source station may occur. A data processing system may be configured to resolve, remove, reduce or identify this converted-SV data (and/or other noise modes, such as P events, P and S multiples, reverberating surface waves, wind noise, etc.) and to emphasize, amplify, or identify the target signal.

A plurality of seismic sensors 1810 are disposed at a plurality of locations within each of one or more shallow or deep holes drilled at any deviation angle. Sensors 1810 may be deployed permanently (e.g., by cementing or otherwise securing them in place) or they may be retrievable via wireline or coil tubing. Sensors 1810 are configured to detect or sense upgoing wave modes, reflected from subsurface sectors, formations, targets of interest, etc. In this embodiment, sensors 1810 each comprise at least one multi-component geophone, for example a three-component geophone configured to sense compressional P mode and both fundamental shear modes (SH and SV). As described in FIGS. 1-14, various arrays and configurations of sources 1802 and sensors 1812 may be implemented in different embodiments.

Sensor deployment equipment and seismic recording system 1812 may be configured to position sensors 1810 within hole 1809, provide power to sensors 1810, and provide other functions needed to deploy sensors 1810. System 1812 comprises a computing system configured to receive seismic data sensed by sensors 1810 via a wired or wireless communication link 1813 and to store the data in a database. System 1812 may be configured to acquire and/or process the received data. For example, processing may comprise polarity-reversal as previously described, the processing steps of FIG. 18 below, or other seismic data processing algorithms.

A digital media 1815 may be coupled to system 1812 using any of a variety of technologies, such as a wired or wireless network, etc. Media 1815 may be configured to store and transfer the sensed and/or processed to data to other computing devices.

Figure 19:
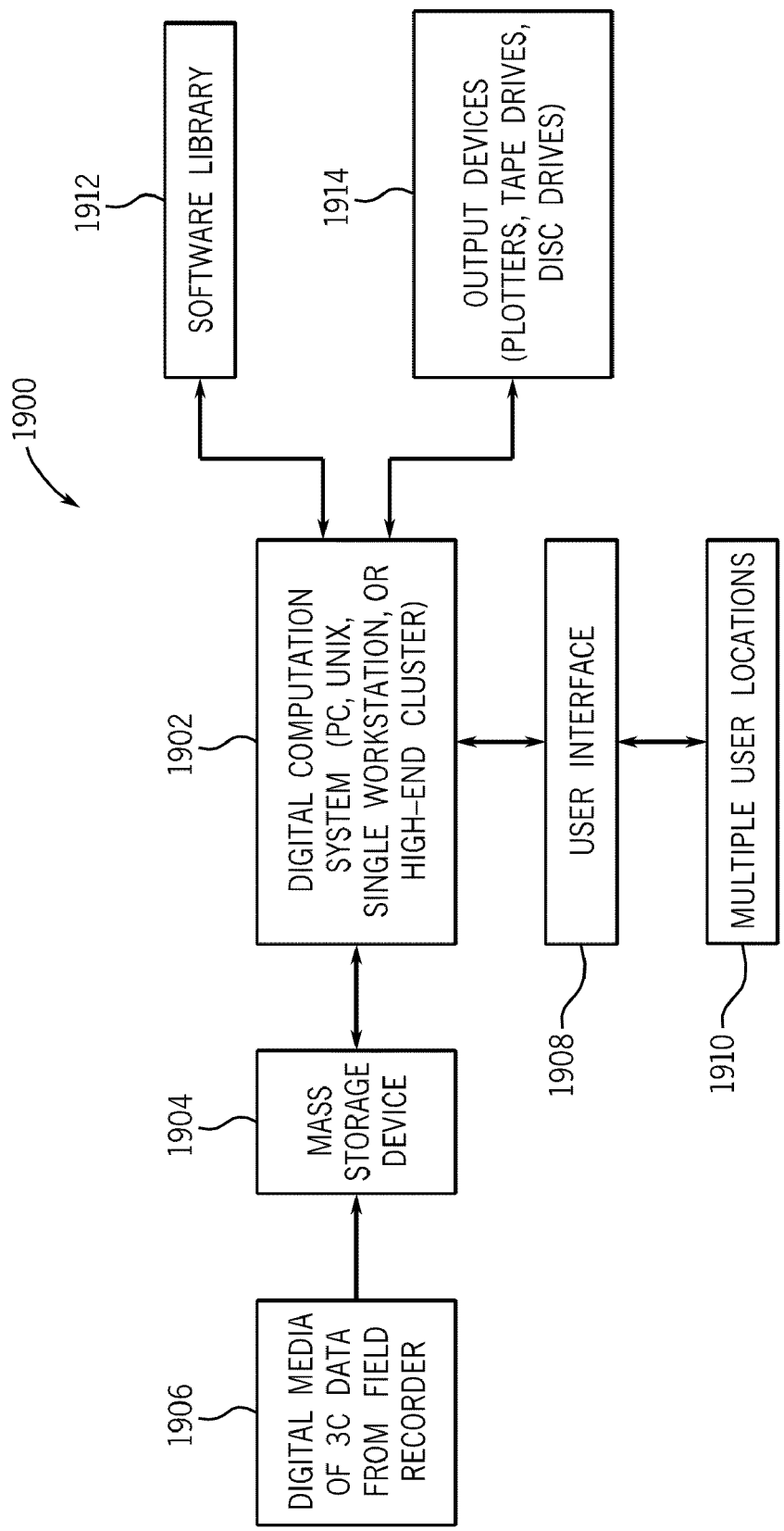
FIG. 19 is block diagram of a data processing system for processing full elastic wavefield data, according to an exemplary embodiment.

Referring now to FIG. 19, a data processing system for processing full elastic wavefield data will be described. System 1900 comprises a digital computation system 1902, such as a personal computer, UNIX server, single workstation, high-end cluster of workstations, or other computing system or systems. System 1902 comprises sufficient processing power to process large quantities of complex seismic data. A mass storage device 1904 or other memory is coupled to digital computation system 1902, which is configured to receive data from the field recorders or sensors stored on a digital media 1906, such as a memory card, hard drive, or other memory device. Mass storage device 1904 is configured to download or receive the multi-component seismic data from digital media 1906 and to store the data in a database.

A user interface 1908, such as a keyboard, display, touch screen display, speaker, microphone, and/or other user interface devices may be coupled to system 1902 for two-way communication between system 1902 and a user. According to one exemplary embodiment, multiple user terminals 1910 may access data processing system 1902 through a user interface using a network of computers, terminals, or other input/output devices (e.g., a wide-area network such as the Internet).

A software library 1912 is coupled to data processing system 1902 and comprises one or more non-transitory computer-readable media programmed to perform one or more processing algorithms. The processing algorithms may comprise any of a number of known seismic data processing algorithms or algorithms described herein or which may be developed in the future. The algorithms can comprise algorithms in two categories: (1) algorithms required to process data acquired by surface-based 3-component sensors, and (2) algorithms required to process data acquired with 3-component sensors positioned in deep wells.

Surface-Based Sensors

For surface-based sensors, data computation system 1902 may be programmed with existing code, both proprietary code and public commercial code. System 1902 may be programmed with new code to optimize data handling and image construction. System 1902 may be programmed to extract P, SH, and SV modes from recorded data, as described herein with reference to FIGS. 1-14.

Deep Well Sensors

When data are acquired with sensors in deep wells, the procedure is called vertical seismic profiling (VSP). VSP data-processing systems are not as widely distributed as are systems for processing surface-sensor data. VSP data may be processed using data-processing systems made or used by VSP contractors, such as Schlumberger, Halliburton, Baker Atlas, READ, and/or other companies. The data processing systems may be configured to extract P, SH, and SV modes from recorded data, by looking for SV and SH radiating directly from a surface source station.

System 1900 may further comprise one or more output devices 1914 coupled to digital computation system 1902. Output devices 1914 may comprise plotters, tape drives, disc drives, etc. configured to receive, store, display and/or present processed data in a useful format.

Figure 20:
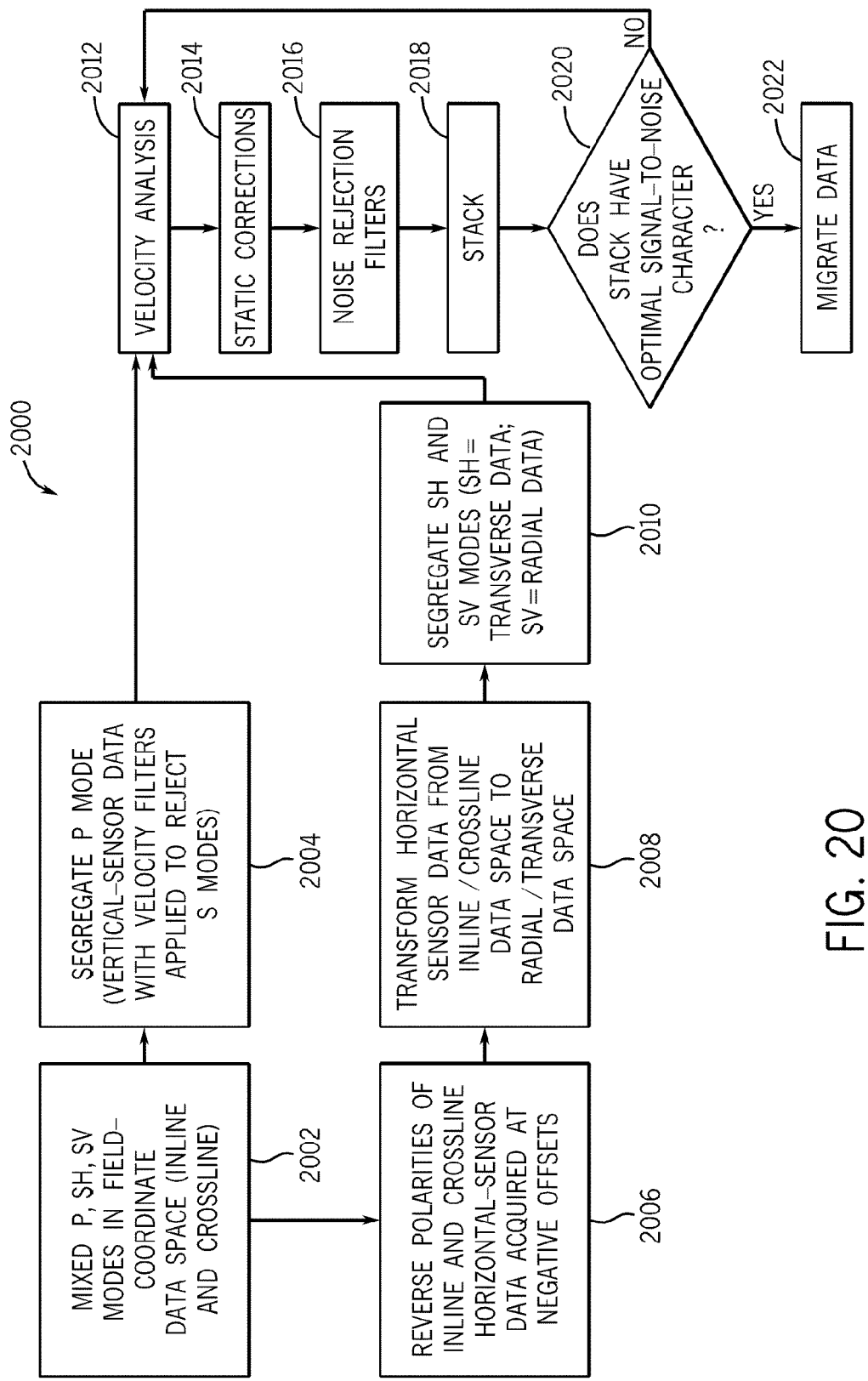
FIG. 20 is a flow diagram illustrating a method of processing full elastic wave data, according to an exemplary embodiment.

Referring now to FIG. 20, a flow diagram illustrating a method 2000 of processing full elastic wave data will be described. The method may be operable on one or more processing circuits, such as digital computation system 2002. At a block 2002, a processing circuit is provided with mixed P, SH and SV modes in field-coordinate data space (inline and crossline) from acquisition steps described previously. At block 2004, the processing circuit is configured to or programmed to segregate, separate or otherwise remove P mode data by applying velocity filters to reject or filter out SH and SV modes.

A velocity filter is any numerical procedure applied to seismic data that emphasizes events that propagate with a certain targeted velocity behavior and attenuates events that propagate with velocities different from this targeted velocity. There are numerous algorithms available to seismic data processors that perform velocity filtering. Some of these filters operate in the frequency-wavenumber (f-k) domain, some in the time-slowness (tau,p) domain, some are median filters in the time-depth domain, etc. Velocity filters allow primary P reflections to be segregated from P multiples, and S events to be isolated from P events.

Converted SV events have a faster velocity than do direct-S events because a converted SV involves a downgoing P wave; whereas, the downgoing raypath for a direct-S event is S (much slower than P). Velocity filters can be designed that pass the slow velocities associated with an S-S event (downgoing S and upgoing S) and reject the faster velocities of P-SV events (downgoing P and upgoing SV).

At a block 2006, the processing circuit is configured to reverse polarities of inline and crossline horizontal-sensor data acquired at negative offsets, as described above with reference to FIGS. 10-14. At a block 2008, the processing circuit is configured to transform horizontal sensor data from inline/crossline data space to radial/transverse data space, as described above with reference to FIGS. 10-14. As a result, the SH and SV modes (SH=transverse data; SV=radial data) are segregated and processed separately.

At a block 2010, radial sensor data are set aside as an SV data base, and transverse sensor data are set aside as an SH data base. This segregation of SV and SH modes allows the modes to be individually introduced (e.g., as separate data sets) into the data-processing stream starting at block 2012.

At a block 2012, any one of numerous velocity analysis procedures available in the seismic data-processing industry may be applied to each wave mode, P, SV, and SH, separately. Popular velocity-analysis options are semblance stacking, frequency-wavenumber analysis, and time-slowness analysis. This step identifies an optimal velocity function for each wave mode that will emphasize primary reflection events for that wave mode and attenuate noise, interbed multiples, and spurious events from competing wave modes.

At a block 2014, static corrections are applied to improve reflector alignment. These corrections involve time shifts of data acquired at each source and receiver station. Because these time shifts are applied to an entire data trace, they are termed static corrections to differentiate them from dynamic time adjustments done by other processes. One static correction removes timing differences caused by variations in station elevations by adjusting time-zero on each data trace to mathematically move all source and receiver stations to a common datum plane. A second static correction removes timing differences cause by different velocities being local to different source and receiver stations. The end result of these static corrections is an improvement in reflection continuity.

At a block 2016, any one of many noise rejection procedures may be applied to the data to improve the signal-to-noise ratio. Some noise rejection options may be simple frequency filters. Others may be more sophisticated tau-p, f-k, or deconvolution procedures.

At a block 2018, the data are stacked (or summed) to create an initial image. Embedded in this step is a dynamic time adjustment of reflection events called a moveout correction that is applied to flatten reflection events to the same time coordinate at all source-receiver offsets. A data-acquisition geometry may cause many source-receiver pairs to produce reflection events at the same subsurface coordinate. In stacking, the flattened reflections from all source-receiver pairs that image the same subsurface coordinate are summed to make a single image trace at that image-space coordinate. When this stacking process is extended across the entire seismic image space, a single image trace with high signal-to-noise character is produced at each image point in the image space. It is at this step that a data processor gets his/her first look at the quality of the velocity analysis and static corrections that have been applied to the data (e.g., by displaying the data on an electronic display, printing the data using a printer, etc.).

At a block 2020, the data processor has to decide if the image is satisfactory or if the data processing should be repeated to improve the accuracy of the velocity analyses that perform the dynamic moveout corrections of reflection events and to improve the accuracies of the static corrections that time shift reflection events at each source and receiver station. If the decision is to repeat the imaging process, the procedure returns to block 2012 and proceeds to block 2020 again. If the Earth consists of flat horizontal layers, these stacked data are a good image of the subsurface geology. If Earth layers are dipping or faulted, these stacked data are not a true image of the geology, but they still indicate the quality of the true image that will be created when the data are migrated (Block 2022).

At a block 2022, the data are migrated. Migration is a procedure that utilizes a seismic-derived velocity model of the Earth to move reflection events from their coordinate positions in offset-vs-time image space to their correct subsurface positions in the Earth. Numerous migration algorithms are available in the seismic data-processing industry. Some algorithms are proprietary to data-processing companies; others are available as commercially leased software or as shared freeware. Time migration assumes velocity varies only in the vertical direction. Depth migration allows velocity to vary both vertically and laterally.

The position of the data migration step on FIG. 20 is a post-stack migration procedure. The migration step can be moved to be positioned between blocks 2016 and 2018 to do pre-stack migration. Pre-stack migration is often more desirable than post-stack migration but is more computer intensive. Both time migration and depth migration can be displayed so that the vertical coordinate axis of the image is either depth or time, depending on the data processor preference.

The teachings herein may be implemented by seismic contractors, oil and gas companies, and others. The teachings herein may be used in other industries as well, such as geothermal energy, $CO_2$ sequestration, etc.

Extant Data

The systems and methods described herein may be applied to processing of extant or pre-existing or legacy sets of seismic data. According to one example, a memory comprises seismic data which may be raw, unprocessed or partially processed. The seismic data may have been generated months or years prior to the processing of the data. A processing circuit may be configured to process the seismic data to generate, provide, or achieve full elastic waveform data. For example, the processing circuit may be configured to reverse polarities of horizontal sensor data acquired at negative offsets as described herein to generate S mode data, such as SH mode and SV mode data. The processing circuit may further be configured to extract P, SH, and SV modes from the previously recorded data. In one embodiment, the seismic sensors will have been receiving data for a sufficient period of time, such as at least ten seconds or at least twelve seconds, in order to receive all of the slower-moving SH and SV modes in addition to the P mode data.

According to one embodiment, sources other than explosive sources (i.e. non-explosive sources, such as vertical vibrators and vertical-impact sources) may be used to construct S-mode images, such as SV and SH images. The advantages of non-explosive sources include that they are acceptable sources in environments where explosive sources are prohibited or impractical. Exemplary advantages include:

Explosives cannot be used in urban environments. In contrast, vibrators can operate down streets, alleys, and in close proximity to buildings.

Explosives cannot be used along road right-of-ways. County roads and public highways are popular profile locations for vibrators.

In areas contaminated by mechanical noise (road traffic, gas-line pumping stations, oil well pump jacks, active drilling rigs, etc.), the compact impulsive wavelet (typically spanning only 100 to 200 ms) produced by an explosive shot can be overwhelmed by short noise bursts from noise sources local to one or more receiver stations. In contrast, a vibrator creates a wavelet by inserting a long (10 to 12 seconds) chirp into the Earth in which frequencies vary with a known time dependence. Unless mechanical noise has exactly the same frequency variation over a 10-second or 12-second time duration as does a vibrator chirp signal, the cross correlation procedure used to identify vibroseis reflection events suppresses the noise. Explosive sources are less practical than vibrators in high-noise environments.

Vertical impact sources have appeal because they are lower cost than explosive sources (and usually lower cost than vibrators). Operators often choose the lowest cost source even if the source has some technical shortcomings.

While non-explosive sources are used in some embodiments described herein, explosive sources may be used in other embodiments described herein.

S data can be acquired in the widest possible range of environments when vertical-force sources are utilized. Explosive sources can be used in swamps, mountains, etc. where non-explosive sources are not feasible or practical, and vibrators and vertical impact sources can be used in high-culture areas (cities, roads, etc) where explosives are prohibited, and when budget constraints limit source options.

The systems and methods described with reference to FIGS. 17-20 may implement any of the features or principles described with reference to FIGS. 1-16.

Various embodiments disclosed herein may include or be implemented in connection with computer-readable media configured to store machine-executable instructions therein, and/or one or more modules, circuits, units, or other elements that may comprise analog and/or digital circuit components (e.g. a processor or other processing circuit) configured, arranged or programmed to perform one or more of the steps recited herein. By way of example, computer-readable media may include non-transitory media such as RAM, ROM, CD-ROM or other optical disk storage, magnetic disk storage, flash memory, or any other non-transitory medium capable of storing and providing access to desired machine-executable instructions. The use of circuit or module herein is meant to broadly encompass any one or more of discrete circuit components, analog and/or digital circuit components, integrated circuits, solid state devices and/or programmed portions of any of the foregoing, including microprocessors, microcontrollers, ASICs, programmable logic, or other electronic devices.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A method of acquiring and processing full elastic waveform data from a vertical-force source, comprising:
   a) providing seismic waves into the earth from the vertical-force source, wherein the vertical-force source produces compressional P mode and direct shear modes (SH and SV) in the earth directly at a point of application of the vertical-force source;
   b) sensing reflections of the seismic waves at multi-component geophones placed along the surface of the earth; and
   c) processing the reflections of the compressional P mode and direct shear mode seismic waves to generate full elastic waveform data, wherein the reflections of the compressional P mode and direct shear mode seismic waves comprise horizontal shear wave mode data, wherein the processing comprises providing polarity correction to the reflections of the direct SH mode to achieve the horizontal shear wave mode data, wherein the processing comprises segregating direct SH and SV modes from the reflections and separately processing each of the direct SH and SV modes using at least one of a velocity analysis, a static correction, a noise rejection filter, a stacking process and a migration step; and
   d) generating P and direct shear images based on the processing.

2. The method of claim 1, wherein the reflections are sensed with a recording time of at least eight seconds.

3. The method of claim 1, wherein the processing comprises applying a velocity filter to isolate SH mode data from P mode data.

4. The method of claim 1, wherein the vertical-force source comprises an explosive source.

5. The method of claim 1, wherein the vertical-force source comprises a non-explosive source.

6. A method of processing horizontal shear wave mode data from a vertical-force source, comprising;
   a) providing seismic waves from the vertical-force source, wherein the vertical-force source produces compressional P mode and both direct shear modes (SH and SV) in the earth directly at a point of application of the vertical-force source;
   b) sensing reflections of the seismic waves at multi-component geophones placed along the surface of the earth; and
   c) processing the reflections of the compressional P mode and direct shear mode seismic waves to generate horizontal shear wave mode data, wherein the processing comprises providing polarity correction to the reflections to achieve the horizontal shear wave mode data, wherein the processing comprises segregating direct SH and SV modes from the reflections and separately processing each of the direct SH and SV modes using at least one of a velocity analysis, a static correction and a noise rejection filter; and d) providing the processed data to an output device.

7. The method of claim 3, wherein the reflections are sensed with a recording time of at least eight seconds.

8. A system for acquiring and processing shear wave mode data from an explosive source, comprising:
   a) a vertical-force source configured to provide seismic waves comprising compressional P mode and direct shear modes (SH and SV) in the earth directly at a point of application of the vertical-force source;
   b) a multi-component geophone placed along the surface of the Earth, wherein the geophone is configured to sense reflections of the seismic waves; and
   c) a processing circuit configured to process the compressional P mode and direct shear mode reflections of the seismic waves to generate horizontal shear wave mode data, wherein the processing comprises providing polarity correction to the direct shear mode reflections to achieve the horizontal shear wave mode data, wherein the processing circuit is configured to segregate direct SH and SV modes from the reflections and separately process each of the direct SH and SV modes using at least one of a velocity analysis and a static correction.

9. The system of claim 8, wherein the reflections are sensed with a recording time of at least eight seconds.

10. A system for acquiring and processing direct shear wave mode data from a vertical-force source other than an explosive source, comprising:
    a) a vertical-force source configured to provide seismic waves comprising compressional P mode and direct shear modes (SH and SV) in the earth directly at a point of application of the vertical-force source, wherein the vertical-force source is a non-explosive source;
    b) a multi-component geophone placed along the surface of the Earth wherein the geophone is configured to sense reflections of the seismic waves; and
    c) a processing circuit configured to process the reflections of the seismic waves to generate direct shear wave mode data, wherein the processing circuit is configured to provide polarity correction to the direct shear mode reflections to achieve the pure shear wave mode data, wherein the processing circuit is configured to segregate direct SH and SV modes from the reflections and separately process each of the direct SH and SV modes using at least one of a velocity analysis and a static correction.

11. The system of claim 10 wherein the vertical-force source is vibratory.

12. The system of claim 10, wherein the vertical-force source is an impact source.

13. The system of claim 10, wherein the vertical-force source is an air gun.

14. The system of claim 10, wherein the generated direct shear wave mode data is horizontal shear wave mode data.

15. The system of claim 10, wherein the reflections are sensed with a recording time of at least eight seconds.

16. The method of claim 1, wherein the polarity correction further comprises determining a positive-polarity domain and a negative-polarity domain, wherein the multi-component geophones comprise a first set of receivers in the positive-polarity domain and a second set of receivers in the negative-polarity domain, the polarity correction further comprises applying data polarity reversals to vertical-force source data received at the receivers in either of the positive-polarity domain or the negative-polarity domain to create constant-polarity S-wave data across a seismic image space.

\* \* \* \* \*

UNITED STATES PATENT AND TRADEMARK OFFICE
CERTIFICATE OF CORRECTION

PATENT NO. : 8,040,754 B1  
APPLICATION NO. : 12/870601  
DATED : October 18, 2011  
INVENTOR(S) : Bob A. Hardage Page 1 of 1

It is certified that error appears in the above-identified patent and that said Letters Patent is hereby corrected as shown below:

<u>Col. 7, line 27:</u>

Delete "source received"

<u>Col. 14, line 26:</u>

Delete "to data to" and replace with -- the data to --

<u>Claim 7, col. 19, line 29</u>

Delete "claim 3" and replace with -- claim 6 --

Signed and Sealed this  
Twenty-ninth Day of May, 2012

David J. Kappos  
*Director of the United States Patent and Trademark Office*